US012580694B2

(12) United States Patent
Dimou et al.

(10) Patent No.: US 12,580,694 B2
(45) Date of Patent: Mar. 17, 2026

(54) ACKNOWLEDGMENT REPORTING FOR MULTI-LINK TRANSMISSIONS

(71) Applicant: QUALCOMM Incorporated, San Diego, CA (US)

(72) Inventors: Konstantinos Dimou, New York City, NY (US); Yan Zhou, San Diego, CA (US); Mostafa Khoshnevisan, San Diego, CA (US); Tao Luo, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 218 days.

(21) Appl. No.: 17/759,231

(22) PCT Filed: Jan. 28, 2021

(86) PCT No.: PCT/US2021/015551
§ 371 (c)(1),
(2) Date: Jul. 21, 2022

(87) PCT Pub. No.: WO2021/155041
PCT Pub. Date: Aug. 5, 2021

(65) Prior Publication Data
US 2023/0073645 A1     Mar. 9, 2023

(30) Foreign Application Priority Data
Jan. 31, 2020     (GR) ............................... 20200100053

(51) Int. Cl.
H04W 72/21          (2023.01)
H04L 1/1607         (2023.01)
H04L 1/1867         (2023.01)

(52) U.S. Cl.
CPC ............ H04L 1/189 (2013.01); H04L 1/1692 (2013.01)

(58) Field of Classification Search
CPC .............................. H04L 1/189; H04L 1/1692
See application file for complete search history.

(56) References Cited

U.S. PATENT DOCUMENTS 8,848,591 B2     9/2014  Liu et al.
9,960,896 B2 *   5/2018  Pan ........................ H04L 1/1635
(Continued)

FOREIGN PATENT DOCUMENTS

CN          108282257 A       7/2018
WO     WO-2010149206 A1    12/2010
(Continued)

OTHER PUBLICATIONS

International Search Report and Written Opinion—PCT/US2021/015551—ISA/EPO—May 14, 2021 (201952WO).

*Primary Examiner* — Siren Wei
(74) *Attorney, Agent, or Firm* — Holland & Hart LLP

(57)          ABSTRACT

Methods, systems, and devices for wireless communications are described. A user equipment (UE) may transmit acknowledgment feedback for a combined signal derived from individual downlink signals received on respective radio links, where the acknowledgment feedback is transmitted with a phase shift applied to the transmission. In some cases, the phase shift may indicate which individual downlink signals were unsuccessfully received and decoded on the respective radio links. For example, the acknowledgment feedback message may include acknowledgment feedback for a final decoding of the combined signal on whether the combined signal is successfully received and decoded and side negative acknowledgment information indicating which individual radio links were unsuccessfully received and decoded via the phase shift. The UE may transmit the (Continued)

acknowledgment feedback on a strongest radio link, a subset
of the radio links, or on all of the radio links.

30 Claims, 22 Drawing Sheets

(56)                    References Cited

U.S. PATENT DOCUMENTS

| | | | |
|---|---|---|---|
| 2005/0030964 A1 | 2/2005 | Tiedemann, Jr. et al. | |
| 2018/0242231 A1 | 8/2018 | Reial et al. | |
| 2019/0150181 A1 | 5/2019 | Kim et al. | |
| 2019/0165837 A1 | 5/2019 | Son et al. | |
| 2020/0281011 A1* | 9/2020 | Xiong | H04B 7/0695 |
| 2021/0320834 A1* | 10/2021 | Sundberg | H04L 1/1812 |
| 2021/0391967 A1* | 12/2021 | Gao | H04L 5/005 |
| 2022/0029746 A1* | 1/2022 | Noh | H04L 27/2601 |
| 2022/0077969 A1* | 3/2022 | Kim | H04L 1/1861 |

FOREIGN PATENT DOCUMENTS

| | | |
|---|---|---|
| WO | WO-2011123809 A1 | 10/2011 |
| WO | WO-2017031623 A1 | 3/2017 |

* cited by examiner

Figures 2A, 2B, 2C:
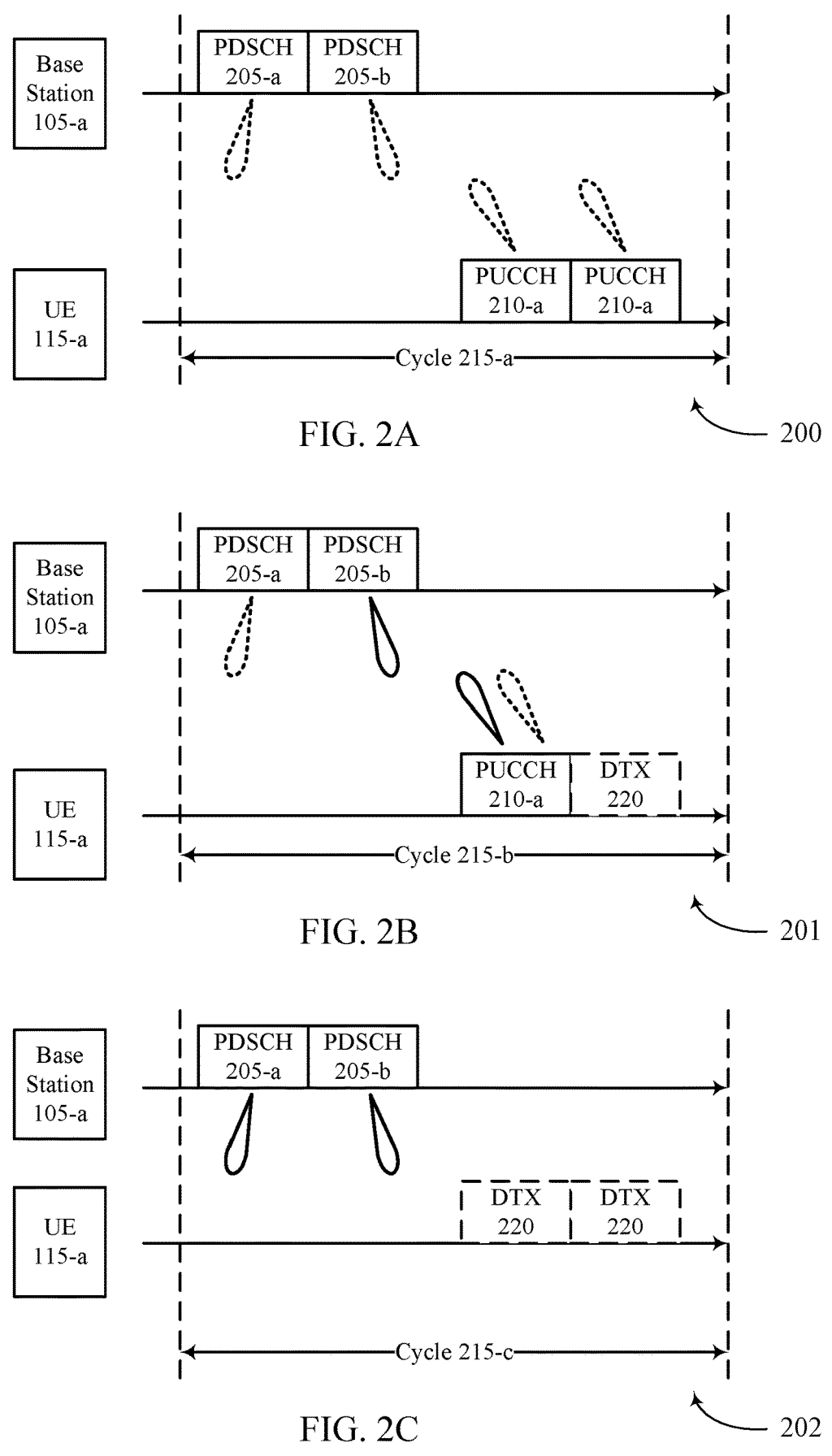

Base Station 105-a

PDSCH 205-a | PDSCH 205-b

UE 115-a

PUCCH 210-a | PUCCH 210-a

Cycle 215-a

Base Station 105-a

PDSCH 205-a | PDSCH 205-b

UE 115-a

PUCCH 210-a | DTX 220

Cycle 215-b

Base Station 105-a

PDSCH 205-a | PDSCH 205-b

UE 115-a

DTX 220 | DTX 220

Cycle 215-c

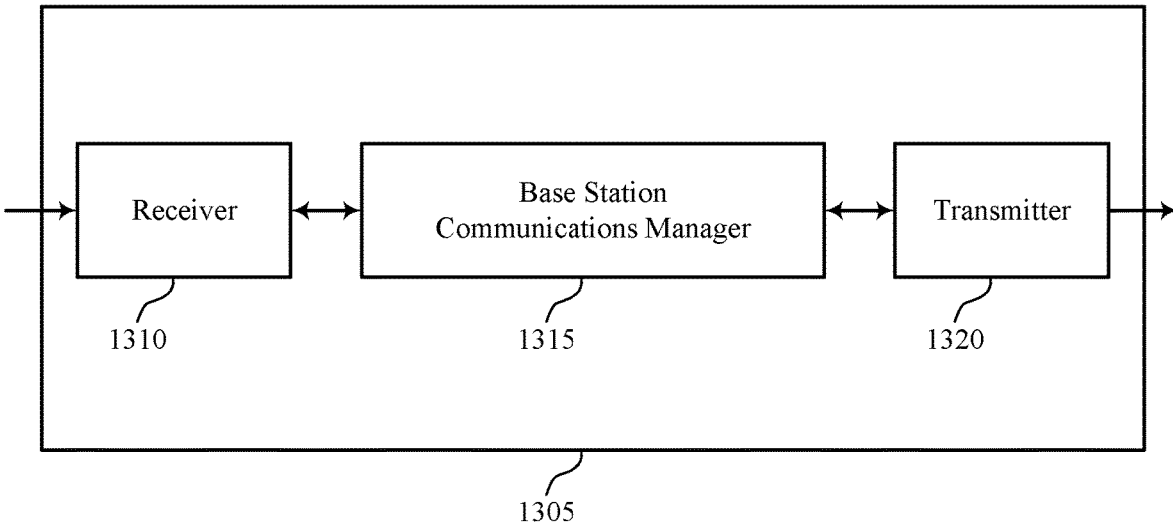
1310                    1315                    1320
1305
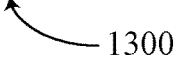
1300
FIG. 13

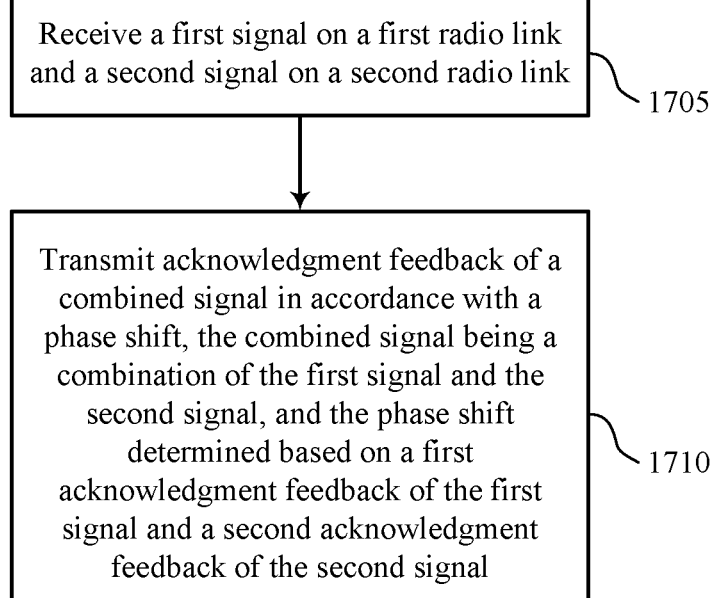

Receive a first signal on a first radio link and a second signal on a second radio link

1705

Transmit acknowledgment feedback of a combined signal in accordance with a phase shift, the combined signal being a combination of the first signal and the second signal, and the phase shift determined based on a first acknowledgment feedback of the first signal and a second acknowledgment feedback of the second signal

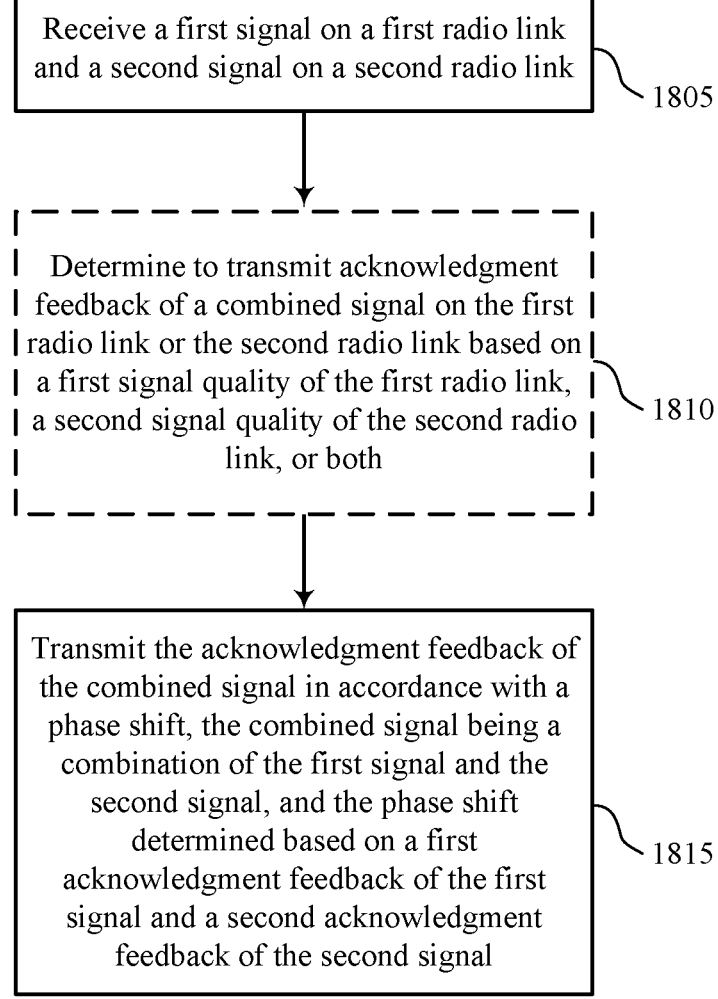

Receive a first signal on a first radio link and a second signal on a second radio link

1805

Determine to transmit acknowledgment feedback of a combined signal on the first radio link or the second radio link based on a first signal quality of the first radio link, a second signal quality of the second radio link, or both

1810

Transmit the acknowledgment feedback of the combined signal in accordance with a phase shift, the combined signal being a combination of the first signal and the second signal, and the phase shift determined based on a first acknowledgment feedback of the first signal and a second acknowledgment feedback of the second signal

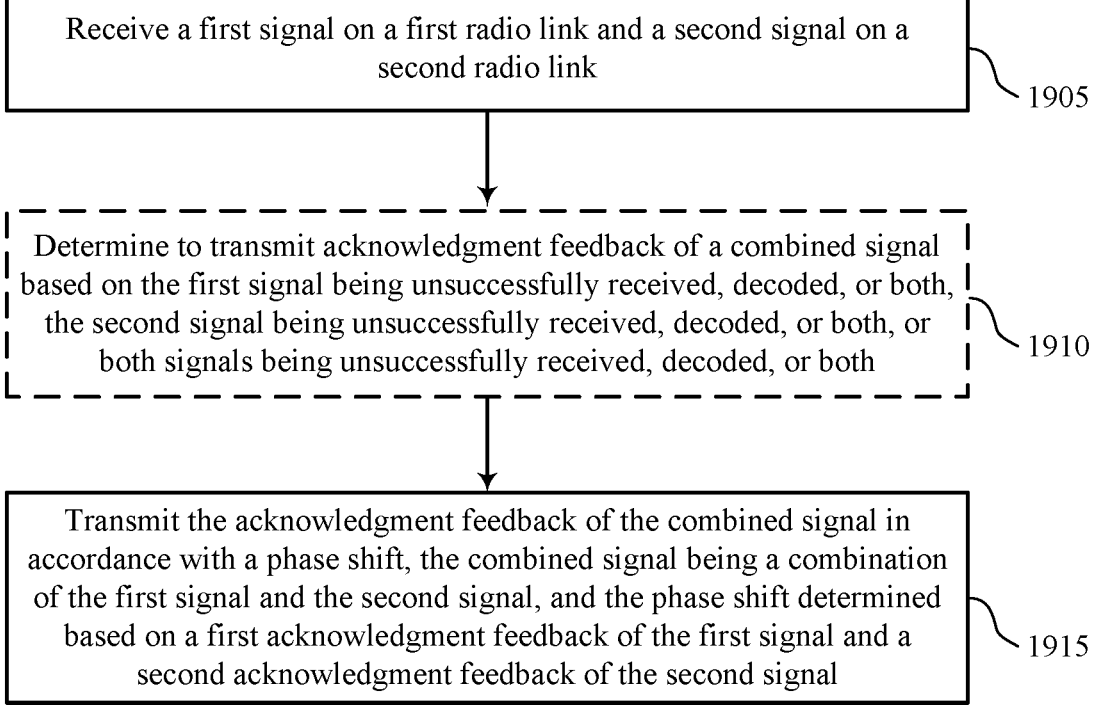

Receive a first signal on a first radio link and a second signal on a second radio link
— 1905

Determine to transmit acknowledgment feedback of a combined signal based on the first signal being unsuccessfully received, decoded, or both, the second signal being unsuccessfully received, decoded, or both, or both signals being unsuccessfully received, decoded, or both
— 1910

Transmit the acknowledgment feedback of the combined signal in accordance with a phase shift, the combined signal being a combination of the first signal and the second signal, and the phase shift determined based on a first acknowledgment feedback of the first signal and a second acknowledgment feedback of the second signal
— 1915

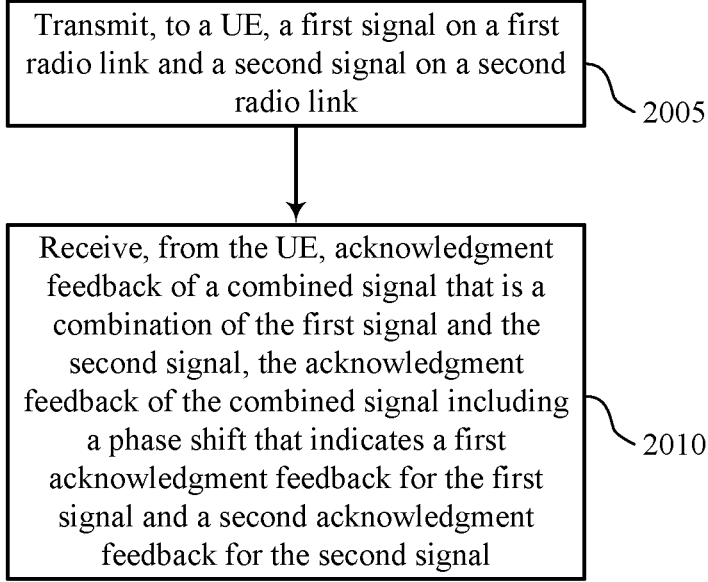

Transmit, to a UE, a first signal on a first radio link and a second signal on a second radio link

2005

Receive, from the UE, acknowledgment feedback of a combined signal that is a combination of the first signal and the second signal, the acknowledgment feedback of the combined signal including a phase shift that indicates a first acknowledgment feedback for the first signal and a second acknowledgment feedback for the second signal

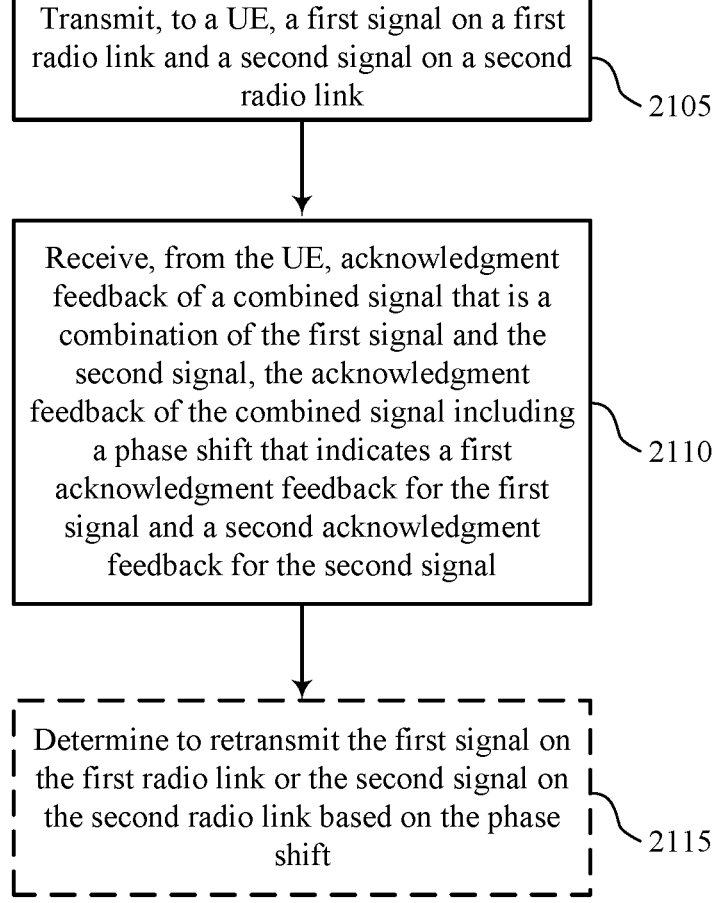

Transmit, to a UE, a first signal on a first radio link and a second signal on a second radio link

2105

Receive, from the UE, acknowledgment feedback of a combined signal that is a combination of the first signal and the second signal, the acknowledgment feedback of the combined signal including a phase shift that indicates a first acknowledgment feedback for the first signal and a second acknowledgment feedback for the second signal

2110

Determine to retransmit the first signal on the first radio link or the second signal on the second radio link based on the phase shift

ACKNOWLEDGMENT REPORTING FOR MULTI-LINK TRANSMISSIONS

CROSS REFERENCE

The present application is a 371 national stage filing of International PCT Application No. PCT/US2021/015551 by DIMOU et al. entitled "ACKNOWLEDGMENT REPORTING FOR MULTI-LINK TRANSMISSIONS," filed Jan. 28, 2021; and claims priority to Greece Provisional Patent Application No. 20200100053 by DIMOU et al., entitled "ACKNOWLEDGMENT REPORTING FOR MULTI-LINK TRANSMISSIONS," filed Jan. 31, 2020, each of which is assigned to the assignee hereof, and each of which is expressly incorporated by reference in its entirety herein.

Introduction

The following relates to wireless communications and more specifically to managing acknowledgment reporting for transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communications at a UE is described. The method may include receiving a first signal on a first radio link and a second signal on a second radio link. In some cases, the method may also include transmitting acknowledgment feedback of a combined signal in accordance with a phase shift, the combined signal being a combination of the first signal and the second signal, and the phase shift determined based on a first acknowledgment feedback of the first signal and a second acknowledgment feedback of the second signal.

An apparatus for wireless communications at a UE is described. The apparatus may include a processor and memory coupled with the processor. The processor and the memory may be configured to receive a first signal on a first radio link and a second signal on a second radio link. In some cases, the processor and the memory may also be configured to transmit acknowledgment feedback of a combined signal in accordance with a phase shift, the combined signal being a combination of the first signal and the second signal, and the phase shift determined based on a first acknowledgment feedback of the first signal and a second acknowledgment feedback of the second signal.

Another apparatus for wireless communications at a UE is described. The apparatus may include means for receiving a first signal on a first radio link and a second signal on a second radio link. In some cases, the apparatus may also include means for transmitting acknowledgment feedback of a combined signal in accordance with a phase shift, the combined signal being a combination of the first signal and the second signal, and the phase shift determined based on a first acknowledgment feedback of the first signal and a second acknowledgment feedback of the second signal.

A non-transitory computer-readable medium storing code for wireless communications at a UE is described. The code may include instructions executable by a processor to receive a first signal on a first radio link and a second signal on a second radio link. In some cases, the code may include instructions executable by the processor to transmit acknowledgment feedback of a combined signal in accordance with a phase shift, the combined signal being a combination of the first signal and the second signal, and the phase shift determined based on a first acknowledgment feedback of the first signal and a second acknowledgment feedback of the second signal.

Some examples of the method, apparatuses, and non-transitory computer-readable medium described herein may further include operations, features, means, or instructions for determining to transmit the acknowledgment feedback of the combined signal on the first radio link or the second radio link based on a first signal quality of the first radio link, a second signal quality of the second radio link, or both.

In some examples of the method, apparatuses, and non-transitory computer-readable medium described herein, the acknowledgment feedback of the combined signal may be transmitted on the first radio link based on the first signal quality being higher than the second signal quality, or the acknowledgment feedback of the combined signal may be transmitted on the second radio link based on the second signal quality being higher than the first signal quality.

Some examples of the method, apparatuses, and non-transitory computer-readable medium described herein may further include operations, features, means, or instructions for determining the first signal is unsuccessfully received, the second signal is unsuccessfully received, and the combined signal is unsuccessfully received, where the phase shift is determined to be zero based on unsuccessfully receiving the first signal, the second signal, and the combined signal.

Some examples of the method, apparatuses, and non-transitory computer-readable medium described herein may further include operations, features, means, or instructions for determining the first signal is unsuccessfully received, the second signal is unsuccessfully received, and the combined signal is unsuccessfully received, where the phase shift is determined based on unsuccessfully receiving the first signal, the second signal, and the combined signal and where the phase shift is different than a phase shift option for a successful reception and decoding of the combined signal.

Some examples of the method, apparatuses, and non-transitory computer-readable medium described herein may further include operations, features, means, or instructions for determining the first signal is successfully received and decoded and the second signal is successfully received and decoded, and refraining from transmitting the acknowledgment feedback of the combined signal based on successfully receiving and decoding the first signal and the second signal.

In some examples of the method, apparatuses, and non-transitory computer-readable medium described herein, the phase shift may be based on whether the first signal is successfully received and decoded and whether the second signal is successfully received and decoded.

In some examples of the method, apparatuses, and non-transitory computer-readable medium described herein, the phase shift may be applied to the acknowledgment feedback of the combined signal based on the first signal or the second signal being successfully received and decoded.

Some examples of the method, apparatuses, and non-transitory computer-readable medium described herein may further include operations, features, means, or instructions for receiving an additional signal on an additional radio link, and determining additional acknowledgment feedback for the additional signal, where the phase shift is determined based on the additional acknowledgment feedback for the additional signal and the acknowledgment feedback of the combined signal is transmitted based on the additional signal.

Some examples of the method, apparatuses, and non-transitory computer-readable medium described herein may further include operations, features, means, or instructions for determining to transmit the acknowledgment feedback of the combined signal on the first radio link based on the first signal being successfully received or to transmit the acknowledgment feedback of the combined signal on the second radio link based on the second signal being successfully received.

Some examples of the method, apparatuses, and non-transitory computer-readable medium described herein may further include operations, features, means, or instructions for determining to transmit the acknowledgment feedback of the combined signal on the first radio link based on the first signal being unsuccessfully received or to transmit the acknowledgment feedback of the combined signal on the second radio link based on the second signal being unsuccessfully received.

Some examples of the method, apparatuses, and non-transitory computer-readable medium described herein may further include operations, features, means, or instructions for determining to transmit the acknowledgment feedback of the combined signal on the first radio link and on the second radio link.

Some examples of the method, apparatuses, and non-transitory computer-readable medium described herein may further include operations, features, means, or instructions for determining to transmit the acknowledgment feedback of the combined signal based on the first signal being unsuccessfully received, the second signal being unsuccessfully received, or both signals being unsuccessfully received In some examples of the method, apparatuses, and non-transitory computer-readable medium described herein, the first radio link and the second radio link may include separate beams, radio links via component carriers (CCs), radio links with separate transmission/reception points (TRPs), or a combination thereof.

A method of wireless communications at a base station is described. The method may include transmitting, to a UE, a first signal on a first radio link and a second signal on a second radio link. Additionally, the method may include receiving, from the UE, acknowledgment feedback of a combined signal that is a combination of the first signal and the second signal, the acknowledgment feedback of the combined signal including a phase shift that indicates a first acknowledgment feedback for the first signal and a second acknowledgment feedback for the second signal.

An apparatus for wireless communications at a base station is described. The apparatus may include a processor and memory coupled with the processor. The processor and the memory may be configured to transmit, to a UE, a first signal on a first radio link and a second signal on a second radio link. Additionally, the processor and the memory may be configured to receive, from the UE, acknowledgment feedback of a combined signal that is a combination of the first signal and the second signal, the acknowledgment feedback of the combined signal including a phase shift that indicates a first acknowledgment feedback for the first signal and a second acknowledgment feedback for the second signal.

Another apparatus for wireless communications at a base station is described. The apparatus may include means for transmitting, to a UE, a first signal on a first radio link and a second signal on a second radio link. Additionally, the apparatus may include means for receiving, from the UE, acknowledgment feedback of a combined signal that is a combination of the first signal and the second signal, the acknowledgment feedback of the combined signal including a phase shift that indicates a first acknowledgment feedback for the first signal and a second acknowledgment feedback for the second signal.

A non-transitory computer-readable medium storing code for wireless communications at a base station is described. The code may include instructions executable by a processor to transmit, to a UE, a first signal on a first radio link and a second signal on a second radio link. Additionally, the code may include instructions executable by the processor to receive, from the UE, acknowledgment feedback of a combined signal that is a combination of the first signal and the second signal, the acknowledgment feedback of the combined signal including a phase shift that indicates a first acknowledgment feedback for the first signal and a second acknowledgment feedback for the second signal.

Some examples of the method, apparatuses, and non-transitory computer-readable medium described herein may further include operations, features, means, or instructions for determining to retransmit the first signal on the first radio link or the second signal on the second radio link based on the phase shift.

In some examples of the method, apparatuses, and non-transitory computer-readable medium described herein, receiving the acknowledgment feedback of the combined signal further may include operations, features, means, or instructions for receiving the acknowledgment feedback of the combined signal on the first radio link, the second radio link, or both.

In some examples of the method, apparatuses, and non-transitory computer-readable medium described herein, the acknowledgment feedback of the combined signal may be received on the first radio link based on the first signal being successfully received at the UE or on the second radio link based on the first signal being successfully received at the UE.

In some examples of the method, apparatuses, and non-transitory computer-readable medium described herein, the acknowledgment feedback of the combined signal may be received on the first radio link based on the first signal being unsuccessfully received at the UE, on the second radio link based at least in part the second signal being unsuccessfully received at the UE, or on the first radio link and the second radio link based on the first signal and the second signal being unsuccessfully received at the UE.

Some examples of the method, apparatuses, and non-transitory computer-readable medium described herein may further include operations, features, means, or instructions for determining the first signal is unsuccessfully received at the UE, the second signal is unsuccessfully received at the UE, and the combined signal is unsuccessfully received at the UE based on the phase shift being zero or a value indicative of the first signal, the second signal, and the combined signal being unsuccessfully received at the UE.

Some examples of the method, apparatuses, and non-transitory computer-readable medium described herein may further include operations, features, means, or instructions for transmitting, to the UE, an additional signal on an additional radio link, where the acknowledgment feedback of the combined signal is received based on the additional signal and where the phase shift indicates an additional acknowledgment feedback for the additional signal.

In some examples of the method, apparatuses, and non-transitory computer-readable medium described herein, the first radio link and the second radio link may include separate beams, radio links via CCs, or a combination thereof.

In some examples of the method, apparatuses, and non-transitory computer-readable medium described herein, the phase shift may indicate the first signal, the second signal, or both are unsuccessfully received at the UE via the first acknowledgment feedback and the second acknowledgment feedback.

BRIEF DESCRIPTION OF THE DRAWINGS

FIGS. 2A, 2B, and 2C illustrate examples of wireless communications systems that support acknowledgment reporting for multi-link transmissions in accordance with aspects of the present disclosure.

FIGS. 13 and 14 show block diagrams of devices that support acknowledgment reporting for multi-link transmissions in accordance with aspects of the present disclosure.

FIGS. 17 through 22 show flowcharts illustrating methods that support acknowledgment reporting for multi-link transmissions in accordance with aspects of the present disclosure.

DETAILED DESCRIPTION

Figure 1:
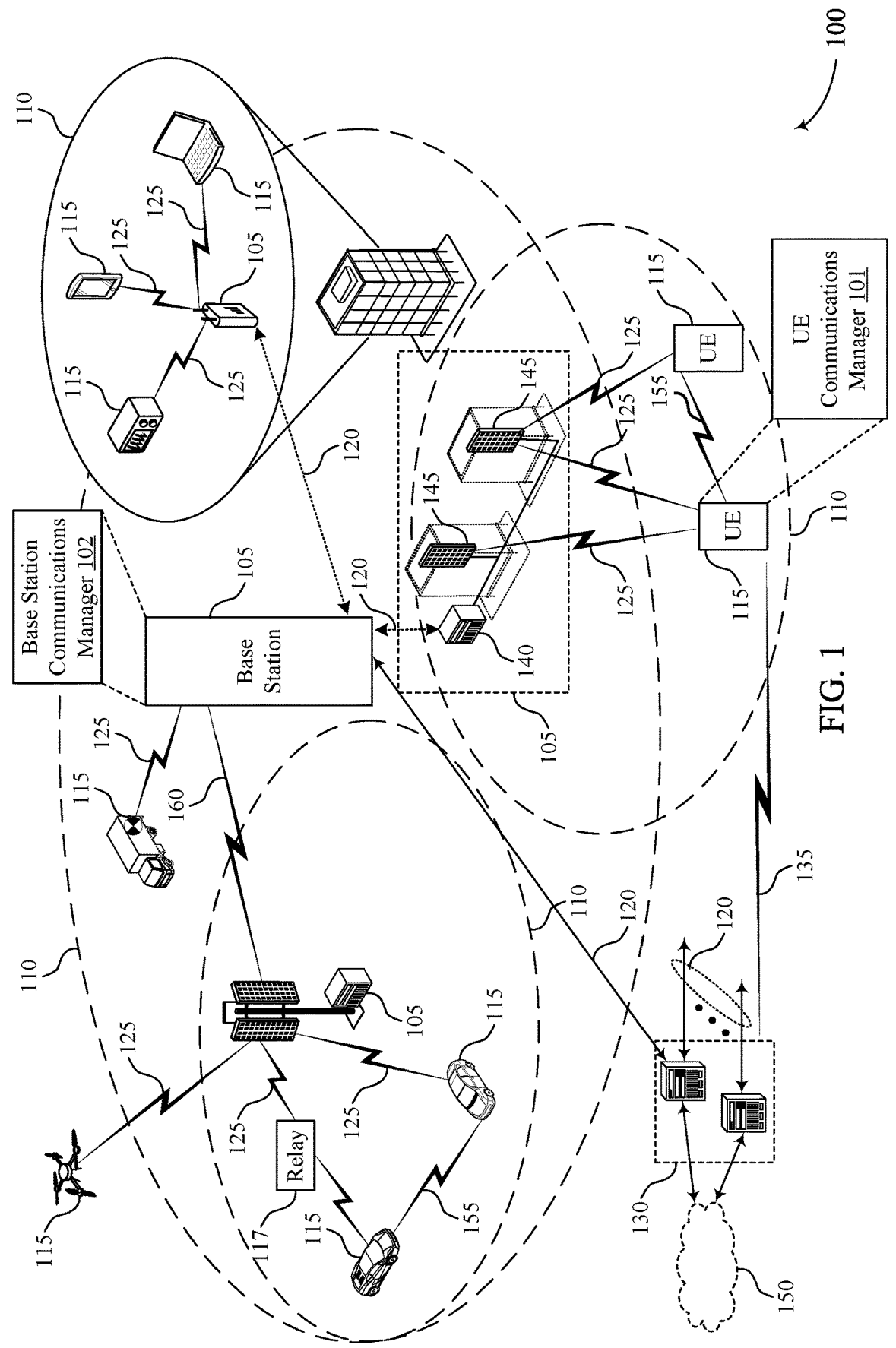
FIG. 1 illustrates an example of a system for wireless communications that supports acknowledgment reporting for multi-link transmissions in accordance with aspects of the present disclosure.

When receiving a downlink message on multiple downlink signals on respective radio links (e.g., multi-TRP scenario, different beams, different CCs, etc.), a UE may determine acknowledgment feedback for each downlink signal based on successfully receiving and decoding the downlink message on each radio link. Additionally, the UE may attempt to combine the downlink signals to increase chances for successfully receiving (e.g., and decoding) the full downlink message and determine acknowledgment feedback for the combined signal based on successfully receiving (e.g., and decoding) the downlink message from the combined signal. For services with higher reliability requirements (e.g., ultra-reliable low-latency communications (URLLC)), the UE may need to transmit a higher number of acknowledgment feedbacks than transmitting the acknowledgment feedback for the combined signal (e.g., final acknowledgment information) alone. Additionally or alternatively, transmitting acknowledgment feedbacks for each downlink signal on the respective radio links and an additional acknowledgment feedback for the combined signal (e.g., on each radio link, on a subset of the radio links, etc.) may explicitly indicate acknowledgment feedback for each downlink signal and for a combination of the downlink signals using corresponding acknowledgment feedback messages.

As described herein, the UE may transmit the acknowledgment feedback message for the combined signal with a phase shift applied to the transmission, where the phase shift indicates which individual downlink signals were unsuccessfully received or decoded on the respective radio links. For example, this acknowledgment feedback message for the combined signal with the phase shift applied may include acknowledgment feedback for a final decoding of the combined signal on whether the combined signal is successfully received (e.g., and decoded), such as a positive acknowledgment (ACK) message if successful or a negative acknowledgment (NACK) message if unsuccessful. Additionally, the acknowledgment feedback message for the combined signal with the phase shift applied may include side NACK information indicating which individual radio links were unsuccessful via the phase shift. Accordingly, the acknowledgment feedback message may represent an indication of a final decoding result if at least one of the radio links failed (e.g., at least one of the downlink signals is unsuccessfully received), and the phase shift may indicate which of the radio links failed or which downlink signals were unsuccessfully received (e.g., and decoded). In some cases, this acknowledgment feedback message may be referred to as a "soft-NACK" feedback message, where NACK indications for the individual radio links are not explicitly indicated in the acknowledgment feedback message but rather implicitly through the phase shift.

As an example with two radio links, a first phase shift may indicate both radio links had an error (e.g., the corresponding downlink messages were unsuccessfully received) but the combined signal was successfully received (e.g., and decoded), a second phase shift may indicate whichever radio link that is not used to transmit the acknowledgment feedback had an error but the combined signal was successfully received, and no phase shift may indicate both radio links had an error and that the combined signal was not successfully received. Additionally, no acknowledgment feedback may be transmitted if all radio links are received correctly at the UE (e.g., none of the radio links fail). In some cases, this acknowledgment feedback message for the combined signal with the phase shift applied may be transmitted via the radio link(s) (e.g., on separate beams, from separate TRPs, on separate CCs, etc.) in which an error occurred, via the strongest (e.g., "best") radio link, or via all radio links. Accordingly, based on this soft-NACK feedback procedure, robustness of transmitting and performing a feedback procedure may be increased, less uplink interference may be present in the system, more uplink resources may be available to be used, and faster beam adaptation may be performed.

Aspects of the disclosure are initially described in the context of wireless communications systems. Additionally, aspects of the disclosure are illustrated through an additional wireless communications system, a multi-TRP configuration, a multi-beam configuration, a CC configuration, a relay configuration, an information bit mapping configuration, and a process flow. Aspects of the disclosure are further illustrated by and described with reference to apparatus diagrams, system diagrams, and flowcharts that relate to soft negative acknowledgment reporting for multi-link transmissions.

FIG. 1 illustrates an example of a wireless communications system 100 that supports soft negative acknowledgment reporting for multi-link transmissions in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, a TRP, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. In some examples, a relay 117 may forward messages in between a base station 105 and a UE 115 as shown in FIG. 1. Additionally or alternatively, a relay 117 may forward messages in between two UEs 115, between two base stations 105, or between any two devices in wireless communication system 100.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. In some examples, a base station 105 may be referred to as a TRP for both downlink and uplink communications with a UE 115, or a base station 105 may include multiple TRPs for respective communication links with one or more UEs 115. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 may include a UE communications manager 101. The UE communications manager 101 may receive multiple signals on respective radio links (e.g., multiple instances of a same downlink message on the respective radio links) and may determine acknowledgment feedback for each of the signals and for a combined signal that is a combination of the received multiple signals. Subsequently, the UE communications manager 101 may determine a phase shift for transmitting an acknowledgment feedback message for the combined signal, where the phase sift indicates whether each signal is unsuccessfully received (e.g., or unsuccessfully decoded) at the UE (e.g., an error occurred on the corresponding radio link). Accordingly, the UE communications manager 101 may then transmit the acknowledgment feedback message for the combined signal according to the determined phase shift. In some cases, the acknowledgment feedback message may be transmitted on one or more of the radio links based on whether the signals are successfully received (e.g., and decoded) or not. The multiple radio links may include separate beams, radio links via CCs, radio links with separate TRPs, or a combination thereof.

One or more of the base stations 105 may include a base station communications manager 102. The base station communications manager 102 may transmit multiple signals to a UE 115 on respective radio links and receive an acknowledgment feedback message of a combined signal for a combination of the multiple signals. Additionally, the base station communications manager 102 may identify a phase shift for the acknowledgment feedback message when receiving the acknowledgment feedback message and may determine whether each of the multiple signals were successfully received (e.g., and decoded) or not. In some cases, the base station communications manager 102 may determine to retransmit one or more of the signals based on the phase shift.

FIGS. 2A, 2B, and 2C illustrate examples of wireless communications systems 200, 201, and 202 that support acknowledgment reporting for multi-link transmissions in accordance with aspects of the present disclosure. In some examples, wireless communications systems 200, 201, and 202 may implement aspects of wireless communications system 100. For example, wireless communications systems 200, 201, and 202 may include a base station 105-*a* and a UE 115-*a*, which may be examples of corresponding base stations 105 and UEs 115, respectively, as described with reference to FIG. 1.

In some cases, UE 115-*a* may receive one or more downlink transmissions from base station 105-*a* on multiple radio links (e.g., multiple beams, multiple CCs, etc.). For example, base station 105-*a* may transmit a first physical downlink shared channel (PDSCH) 205-*a* and a second PDSCH 205-*b*. Additionally or alternatively, although not shown, UE 115-*a* may communicate with multiple base stations 105 in a multi-TRP system (e.g., multi-TRP (mTRP) communications), where each base station 105 transmits a single PDSCH 205 to UE 115-*a*, or may communicate with base station 105-*a* via a relay node (e.g., such as an additional base station 105, a relay device, an additional UE 115, a repeater, etc.), where base station 105-*a* transmits first PDSCH 205-*a* directly to UE 115-*a* and second PDSCH 205-*b* to UE 115-*a* via the relay node (e.g., or vice versa). In some cases, the PDSCHs 205 may include different types of downlink transmissions for UE 115-*a*, such as semi-persistent scheduling (SPS) messages (e.g., in case of URLLC), downlink control information (DCI)-controlled PDSCH transmissions, or additional types of downlink transmissions not expressly indicated herein.

Additionally, the PDSCHs 205 may carry different instances of a same downlink message on the respective radio links (e.g., a first instance of the downlink message on the first PDSCH 205-*a* and a second instance of the same downlink message on the second PDCSCH 205-*b*) to increase reliability the downlink message is fully received and decoded by UE 115-*a*. For example, UE 115-*a* may attempt to combine each of the instances of the downlink message into a combined downlink message (e.g., a combined signal) to increase chances that the full downlink message is successfully received across the different PDSCHs 205 and radio links at UE 115-*a*. Accordingly, in some cases, UE 115-*a* may transmit acknowledgment feedback in a physical uplink control channel (PUCCH) 210 to base station 105-*a* indicating if the combined downlink message from the different instances of the downlink messages is successfully received and decoded. However, for services with higher reliability requirements (e.g., URLLC services), UE 115-*a* may need to transmit acknowledgment feedback for additional signaling (e.g., the individual radio links) rather than transmitting the acknowledgment feedback for the combined downlink message alone (e.g., final acknowledgment information).

Additionally, when attempting to receive and decode the combined signal, UE 115-*a* may also process each of the PDSCHs 205 and corresponding instances of the downlink message individually. For example, one or more of the instances of the downlink message may have an error when being transmitted over a corresponding radio link (e.g., an erroneous radio link), UE 115-*a* may have errors receiving (e.g., and/or decoding) the corresponding PDSCH 205, or a combination thereof. As such, UE 115-*a* may determine a NACK feedback for the radio link where the error occurred for receiving (e.g., and decoding) the instance of the downlink message. Accordingly, in some cases, UE 115-*a* may be able to transmit individual acknowledgment feedback messages for each PDSCH 205 and for the erroneous radio link on that radio link. However, transmitting the acknowledgment feedback for each PDSCH 205 and the corresponding instance of the downlink message on the respective radio links and for the combined downlink message (e.g., on each radio link, on a subset of the radio links, etc.) may result in higher signaling overhead, an increase in delays, and uplink interference caused by transmitting the multiple acknowledgment feedback messages.

As shown in the example of FIG. 2A, during a first cycle 215-*a*, base station 105-*a* may transmit the first PDSCH 205-*a* and the second PDSCH 205-*b* (e.g., SPS PDSCHs) on respective, separate beams (e.g., different radio links, different CCs, etc.). However, an error may occur during communication (e.g., transmission or reception or both) of the PDSCHs 205 for UE 115-*a*. Accordingly, UE 115-*a* may transmit a first NACK in a first PUCCH 210-*a* to base station 105-*a* for the first PDSCH 205-*a* (e.g., on a first radio link) and a second NACK in a second PUCCH 210-*b* to base station 105-*a* for the second PDSCH 205-*b* (e.g., on a second radio link). Additionally or alternatively, UE 115-*a* may be unable to transmit the NACKs based on a same or similar error occurring on the corresponding beams (e.g., radio links). However, base station 105-*a* may determine UE 115-*a* is still active on the corresponding beams (e.g., the PUCCHs 210 are still active) and, as such, may determine the PDSCHs 205 were unsuccessfully received based on the active beams or channels.

Additionally, as shown in FIG. 2B, during a second cycle 215-*b*, base station 105-*a* may transmit the PDSCHs 205 on the respective beams (e.g., radio links) to UE 115-*a*.

However, as opposed to FIG. 2A, an error may occur during communication (e.g., transmission or reception or both) of the first PDSCH 205-*a*, but no error may occur for communication (e.g., transmission or reception or both) of the second PDSCH 205-*b*. As such, UE 115-*a* may transmit a NACK in the first PUCCH 210-*a* for the first PDSCH 205-*a* (e.g., on the first radio link). For the second PDSCH 205-*b*, UE 115-*a* may transmit an ACK, may refrain from transmitting any acknowledgment feedback, and/or may enter a discontinuous transmission (DTX) 220 (e.g., an inactive duration, a sleep duration, an idle duration, etc.), where the beam, radio link, channel, etc., corresponding to the second PUCCH 210-*b* becomes inactive. Accordingly, based on the ACK and/or DTX 220, base station 105-*a* may determine that UE 115-*a* successfully received the second PDSCH 205-*b*.

As shown in FIG. 2C, during a third cycle 215-*c*, base station 105-*a* may transmit the PDSCHs 205 on the respective beams (e.g., radio links) to UE 115-*a*. However, as opposed to FIGS. 2A and 2B, no errors may occur during communication (e.g., transmission and reception) of both PDSCHs 205 for UE 115-*a*. As such, UE 115-*a* may transmit an ACK and/or enter DTX 220 for both radio links for the PDSCHs 205 and PUCCHs 210. In some cases, the first cycle 215-*a* may represent a cycle for a packet with a first sequence number (e.g., sequence number 0) until the packet for the first sequence expires. Additionally, the second cycle 215-*b* may represent a cycle for a packet with a second sequence number (e.g., sequence number 1) until the packet for the second sequence number expires. The third cycle 215-*c* may represent a cycle for a packet with a third sequence number (e.g., sequence number 2) until the packet for the third sequence number expires.

As described herein, upon erroneous reception of a PDSCH 205 from at least one radio link (e.g., a single active link), from a subset of radio links (e.g., different radio links, beams, TRPs, CCs, etc.), or from all radio links, UE 115-*a* may transmit a final decoding result (e.g., HARQ ACK/NACK feedback) for the combined downlink message with side NACK information indicating which radio links had errors. For example, upon erroneous reception from at least one radio link (e.g., single active channel, beam, TRP, CC, etc.), UE 115-*a* may send an acknowledgment feedback message (e.g., even in cases of "NACK-only" HARQ schemes) as a soft-NACK feedback message (e.g., an acknowledgment message for the final decoding result with side NACK information for the individual erroneous radio link(s)).

In some cases, UE 115-*a* may transmit this acknowledgment feedback message (e.g., soft-NACK feedback) via the radio link (e.g., a beam, to a TRP, via a CC) in which the error occurred, via a strongest ("best") radio link (e.g., an error-free radio link that has a highest signal quality, a highest signal power, etc.), via a subset of the radio links, or via all radio links. Additionally, the side NACK information indicating which radio links had errors may be signaled via a determined phase shift to apply to the acknowledgment feedback message. For example, the determined phase shift may indicate which radio link(s) failed.

Subsequently, base station 105-*a* may not retransmit the downlink message from a radio link in which an error occurred. In some cases, where multiple base stations 105 are separately transmitting the instances of the downlink message to UE 115-*a* (e.g., multi-TRP system), a fast backhaul connection (e.g., no latency) may exist between the base stations 105 (e.g., TRPs).

For a multi-link downlink transmission (e.g., multi-TRP with a common unique DCI, multi-beam, multi-CC, or any case in which received signals can be combined), as described previously, upon reception of each PDSCH 205 at UE 115-*a* on the various radio links, UE 115-*a* may combine the received signals (e.g., instances of the downlink message) from the various radio links (e.g., two (2) radio links, three (3) radio links, four (4) radio links, etc.). Subsequently, this combined signal may then go through a reception chain. That is, after the signal combination, UE 115-*a* may demap symbols of the combined signal from antenna ports and/or resources that the individual signals are received on, where the symbols are then demodulated, descrambled, and decoded and a CRC takes place (e.g., to determine if the combined signal is successfully received and decoded).

As described herein, UE 115-*a* may perform a per radio link separate reception processing and outcome (e.g., determine whether a downlink signal on each individual radio link is successfully received and decoded) and may include these separate reception outcomes in a single acknowledgment feedback message (e.g., the soft-NACK feedback message). Accordingly, UE 115-*a* may save received symbols from the separate radio links at a common buffer for eventual combining.

In some cases, upon negative reception from all reception chains (e.g., each radio link has an error for UE 115-*a* receiving and/or decoding the corresponding downlink signal), UE 115-*a* may combine the received symbols, and the combined symbols may be processed again. This scheme may operate with a single receiver chain or with multiple receiver chains (e.g., a single receiver chain might result in delays based on processing each radio link consecutively rather than simultaneous processing using the multiple receiver chains). As an example for when UE 115-*a* receives a downlink message on two (2) radio links, different events may be reported by UE 115-*a* for reception of the downlink message on the two (2) radio links based on attempting to receive and decode the downlink message on each radio link and as a combination of the downlink message from both radio links.

Table 1 below shows the different outcomes that UE 115-*a* can report for the different events. Event 1 may indicate a reception of the downlink message at a first radio link (e.g., a link 1), where UE 115-*a* can determine an ACK (e.g., 1A, 1ACK, etc., where the '1' is indicative of event 1/link 1) or a NACK (e.g., 1N, 1NACK, etc., for event 1/link 1) for the first radio link based on if the downlink message is successfully received and decoded (e.g., the ACK) or not (e.g., the NACK) for the first radio link, and event 2 may indicate a reception of the downlink message at a second radio link (e.g., a link 2), where UE 115-*a* can similarly determine an ACK (e.g., 2A, 2ACK, etc., where the '2' is indicative of event 2/link 2) or a NACK (e.g., 2N, 2NACK, etc., for event 2/link 2) based on successfully receiving and decoding the downlink message for the second radio link. Additionally, UE 115-*a* may determine an outcome for an event 3 that represents the received combined symbols of the first radio link and the second radio link, where UE 115-*a* can determine an ACK (e.g., 3A, 3ACK, etc., where the '3' is indicative of event 3/the combined signal) or a NACK (e.g., 3N, 3NACK, etc., for event 3) based on successfully receiving and decoding the combined downlink message.

TABLE 1

ACK/NACK Feedback for a Multi-Link Downlink Transmission

| List of Events | Outputs | |
| --- | --- | --- |
| Event 3 (Final Decoding) | 3 A(CK) | 3N(ACK) |
| Event 1 | 1A | 1N |
| Event 2 | 2A | 2N |

Additionally, for two (2) radio links (e.g., from two (2) TRPs, on two (2) beams, via two (2) CCs, etc.), when reporting a processing outcome or output for a combined signal of the two (2) radio links (e.g., event 3 as indicated in Table 1), UE 115-*a* may determine a phase shift to apply to the reported outcome and may transmit the outcome for the combined signal with the determined phase shift on one or both of the radio links. The phase shift may indicate which of the two radio links had an error (e.g., a failure, a NACK, etc.) or that both radio links had an error. For example, UE 115-*a* may transmit an indication for the final decoding result (e.g., "Event 3") as an ACK (e.g., 3A) or a NACK (e.g., 3N) if at least one erroneous radio link is determined (e.g., a 1N and/or a 2N) on a chosen radio link with a determined phase shift (e.g., a one (1) bit indication for the final decoding result).

When transmitting the indication for the final decoding result (e.g., the one (1) bit indication) with a phase shift applied for a multi-link downlink transmission, UE 115-*a* may transmit this feedback via a strongest radio link (e.g., of the multiple radio links used to transmit the downlink message to UE 115-*a*). In some cases, UE 115-*a* may transmit a NACK for the combined signal with no phase shift applied to the NACK transmission when NACKs are also determined for each of the radio links. Additionally or alternatively, UE 115-*a* may transmit an ACK for the combined signal with a determined phase shift, where the determined phase shift is based on which of the radio links used for the multi-link downlink transmission are erroneous (e.g., a downlink transmission on the corresponding radio links are unsuccessfully received and/or decoded). Additionally, a NACK for the combined signal (e.g., with NACKs for each of the radio links) may be transmitted by applying a phase shifting in a same way as a phase shift is applied to the ACK for the combined signal with the different options is transmitted, where a different phase shift is used than the phase shifts used for the ACK transmissions for the combined signal.

In some cases, the number of possible phase shifts that UE 115-*a* can use to convey which radio links are erroneous may be represented by $2^{\#RadioLinks}$ phase shifts when the number of radio links is equal to two (2) or $2^{\#RadioLinks-1}$ when the number of NACKs is higher than the number of radio links (e.g., greater than two (2) radio links are used). Additionally, UE 115-*a* may not transmit an ACK for the combined signal when each of the radio links are successful (e.g., the downlink signal is successfully received and decoded by UE 115-*a* on each of the radio links used for the multi-link downlink transmission).

Table 2 below may show different options that UE 115-*a* may report for a multi-link downlink transmission with two (2) radio links. For the first option (e.g., Option 1), where UE 115-*a* transmits a NACK (e.g., an N) based on a failed decoding for the combined signal (e.g., Event 3) and where both of the radio links also failed (e.g., also NACKs or Ns), UE 115-*a* may transmit the NACK for the combined signal without a phase shift being applied to the transmission. In some cases, a NACK for the combined signal (e.g., with NACKs for each of the radio links) may be transmitted by applying a phase shifting in a same way as a phase shift is applied to an ACK for the combined signal, where a different phase shift is used than the phase shifts used for the ACK transmissions for the combined signal. Additionally or alternatively, for the second, third, and fourth options (e.g., Options 2, 3, and 4, respectively), UE 115-*a* may transmit an ACK (e.g., an A) for the combined signal based on successfully decoding the downlink transmission (e.g., by combining the individually received downlink transmissions) but may apply a phase shift to the transmission based on which of the individual radio links failed. For example, a first phase shift (e.g., a phase shift 1) applied to the ACK transmission for the combined signal (e.g., Event 3) may indicate that both separate radio links are erroneous (e.g., Option 2 with NACKs for both radio links but an ACK for the combined signal).

Additionally or alternatively, a second phase shift (e.g., a phase shift 2) may indicate that one of the radio links is erroneous (e.g., the other radio link than the radio link used to transmit the ACK for the combined signal). For example, if the ACK for the combined signal is transmitted with the second phase shift on the first radio link, the second phase shift may indicate that the second radio link had the error (e.g., Option 4). Alternatively, if the ACK for the combined signal is transmitted with the second phase shift on the second radio link, the second phase shift may indicate that the first radio link had the error (e.g., Option 3). In some cases, if the downlink message is received correctly and successfully on both radio links, UE 115-*a* may refrain from transmitting an ACK for the combined signal.

TABLE 2

| Multi-Link Acknowledgment Feedback for Two (2) Radio Links | | | |
|---|---|---|---|
| | Decoding Events | | |
| Options | Event 3 (Final Decoding After Combination) | Event 1 (Link 1 Decoding) | Event 2 (Link 2 Decoding) |
| 1 | N(ACK) | N | N |
| 2 | A(CK) | N | N |
| 3 | A | N | A |
| 4 | A | A | N |

For example, based on Tables 1 and 2, for FIG. 2A, UE 115-*a* may have an output of 1N and 2N. Additionally, UE

115-*a* may have an output of 3A or 3N based on whether the combined signals of PDSCHs 205-*a* and 205-*b* are successfully received or not. In some cases, UE 115-*a* may transmit an indication of the 3A or 3N and may further indicate the 1N and 2N (e.g., that the first radio link and the second radio link failed via a determined phase shift of zero (0) applied to the 3A/3N indication, such as Options 1 and 2). Additionally, for FIG. 2B, UE 115-*a* may have an output of 1N and 2A and may have an output of 3A based on successfully receiving and decoding the combined signals of PDSCHs 205-*a* and 205-*b* since the second PDSCH 205-*b* was successfully received and decoded (e.g., so the combined signal would also be successfully received and decoded if at least one of the individual signals is successfully received and decoded). In some cases, when transmitting the 3A indication, UE 115-*a* may also indicate that the first radio link carrying the first PDSCH 205-*a* had an error and failed (e.g., via a determined phase shift applied to the 3A indication, such as Option 3). Additionally, for FIG. 2C, UE 115-*a* may have an output of 1A, 2A, and 3A. As such, in some cases, based on successfully receiving and decoding each PDSCH 205 and the combined signal, UE 115-*a* may not transmit an acknowledgment feedback message.

When determining on which radio link to transmit the final decoding result with the phase shift, if UE 115-*a* successfully receives the downlink signal on the first radio link (e.g., Event 1 has a 1A output), UE 115-*a* may transmit a 3A indication (e.g., the acknowledgment feedback for the combined signal) on the first radio link, or if UE 115-*a* successfully receives the downlink signal on the second radio link (e.g., Event 2 has a 2A output), UE 115-*a* may transmit the 3A indication on the second radio link (e.g., the output for Event 3 is transmitted on the radio link that the ACK is transmitted on). Additionally or alternatively, the feedback or outcome for the combined signal may be transmitted via the strongest radio link (e.g., whichever link has a higher signal quality, higher signal power, etc.). For example, if neither the first radio link nor the second radio link is successful (e.g., both radio links have errors/failures), UE 115-*a* may determine to transmit the final decoding result for the combined signal (e.g., with the phase shift applied) on the radio link that is stronger.

The above described techniques may be applied to multilink downlink transmissions for greater than two (2) radio links. For example, Table 3 below may indicate the different options UE 115-*a* may determine for receiving (e.g., and decoding) and combining downlink signals (e.g., or downlink messages) on three (3) radio links (e.g., from three (3) TRPs, on three (3) beams, via three (3) CCs, etc.) if at least one (1) of the radio links is erroneous. Accordingly, UE 115-*a* may transmit (e.g., on a strongest radio link) an indication of a final decoding result (e.g., "Event 4") for a combined signal from the three (3) radio links indicating an ACK or a NACK for the combined signal and may apply a phase shift to the final decoding result transmission to indicate which radio links were erroneous.

Similar to Table 2 above, the first option (e.g., Option 1) may include UE 115-*a* transmitting a NACK (e.g., an N) based on a failed decoding for the combined signal (e.g., Event 4) and determining the three (3) radio links also failed (e.g., also NACKs or Ns), where UE 115-*a* transmits the NACK for the combined signal without applying a phase shifting to the transmission (e.g., the phase shift is zero (0)) or the NACK may have a phase shift similar to the techniques used for the ACK transmissions of the combined signals, where the phase shift for the NACK is different than the phase shifts used for the ACK transmissions. Additionally or alternatively, for the other options (e.g., Options 2-8), UE 115-*a* may transmit an ACK (e.g., an A) for the combined signal based on successfully decoding the downlink transmission (e.g., by combining the different instances of the downlink transmission received on the respective radio links) but may apply a phase shift to the transmission based on which of the individual radio links failed. For example, a first phase shift (e.g., a phase shift 1) applied to the ACK transmission for the combined signal (e.g., Event 3) may indicate that all three (3) separate radio links are erroneous (e.g., Option 8 with NACKs for the three (3) radio links but an ACK for the combined signal).

A second phase shift (e.g., phase shift 2) may indicate that the other two (2) radio links are erroneous than the radio link used to carry the final decoding result for the combined signal (e.g., Options 2, 3, and 4). A third and a fourth phase shift (e.g., phase shifts 3 and 4) may indicate that this current radio link (e.g., from which the final decoding result feedback is transmitted) and one of the other two (2) radio links are correct (e.g., Options 5, 6, and 7). For example, if the ACK feedback for the final decoding result is transmitted from the third radio link, the third phase shift may indicate that the second and third radio links are successful and/or that the first radio link is erroneous (e.g., Option 5), and the fourth phase shift may indicate that the first and third radio links are successful and/or that the second radio link is erroneous (e.g., Option 6). In some cases, if the downlink message is received correctly and successfully on all three (3) radio links, UE 115-*a* may refrain from transmitting an ACK for the combined signal.

TABLE 3

Multi-Link Acknowledgment Feedback for Three (3) Radio Links

| Options | Decoding Events | | | |
| --- | --- | --- | --- | --- |
| | Event 4 (Final Decoding After Combination) | Event 1 (Link 1 Decoding) | Event 2 (Link 2 Decoding) | Event 3 (Link 3 Decoding) |
| 1 | N(ACK) | N | N | N |
| 2 | A(CK) | N | N | A |
| 3 | A | N | A | N |
| 4 | A | A | N | N |
| 5 | A | N | A | A |
| 6 | A | A | N | A |
| 7 | A | A | A | N |
| 8 | A | N | N | N |

The multi-link downlink transmissions (e.g., multi-TRP transmissions with a common unique DCI, multi-CC transmissions, multi-beam transmissions, etc.) may be extended to scenarios with four (4) radio links with UE 115-*a* reporting different reception events according to the above described techniques (e.g., using a soft-NACK feedback mechanism). For example, in the case of a downlink transmission sent via four (4) radio links to UE 115-*a*, 16 options may be determined by UE 115-*a* in theory based on transmitting ACK/NACK feedback for a combined signal with a phase shift indicating one or more of the four (4) radio links being erroneous.

That is, $2^{\#RadioLinks}$ options (e.g., events) may be available to UE 115-*a* to report for the combined signal and different phase shifts. Since UE 115-*a* may refrain from transmitting an ACK if downlink transmissions are successful on all four (4) radio links, UE 115-*a* may be left with 15 possible events to be reported. Accordingly, UE 115-*a* may transmit a NACK for the combined signal with no phase shift if all the radio links also have an error (e.g., similar to Option 1 in Tables 2 and 3). Additionally, UE 115-*a* may transmit an ACK for the combined signal with a phase shift indicating which of the four (4) radio links had an error. For example, 12 phase shifts may be possible for all possible combinations of the four (4) radio links having errors. In some cases, scenarios where at least two (2) NACKs are reported for a corresponding at least two (2) radio links may be more meaningful for the combined signal feedback. As such, UE 115-*a* may use eight (8) phase shifts to indicate different possible outcomes for ACK/NACK feedback of the combined signal, where at least two (2) of the four (4) radio links have errors (e.g., $2^{\#RadioLinks-1}=2^3=8$). As indicated above, the number of radio links may correspond to a number of TRPs in a multi-TRP system for transmitting a downlink message to UE 115-*a*, such that the number of possible events or outcomes with a phase shift may be represented by $2^{\#TRP}$ (e.g., or $2^{\#TRP-1}$ for scenarios when reporting at least two (2) NACKs is needed, such as when the number of TRPs or radio links is higher than two (2)).

Based on the techniques described above, different advantages may be realized for wireless communications systems 200, 201, and 202 for transmitting the acknowledgment feedback for a combined signal using a phase shift to indicate which radio links are erroneous in a multi-link downlink transmission situation. For example, feedback robustness may be increased, uplink interference may be decreased, a higher amount of uplink resources may be available for other uses (e.g., if uplink resources used for NACK are shared with low priority traffic physical uplink shared channel (PUSCH) transmissions from other UEs), and beam adaptation may be faster. Additionally, the described techniques may be used for URLLC services, where a NACK may rarely occur, or may be extended to additional services and systems.

Figure 3:
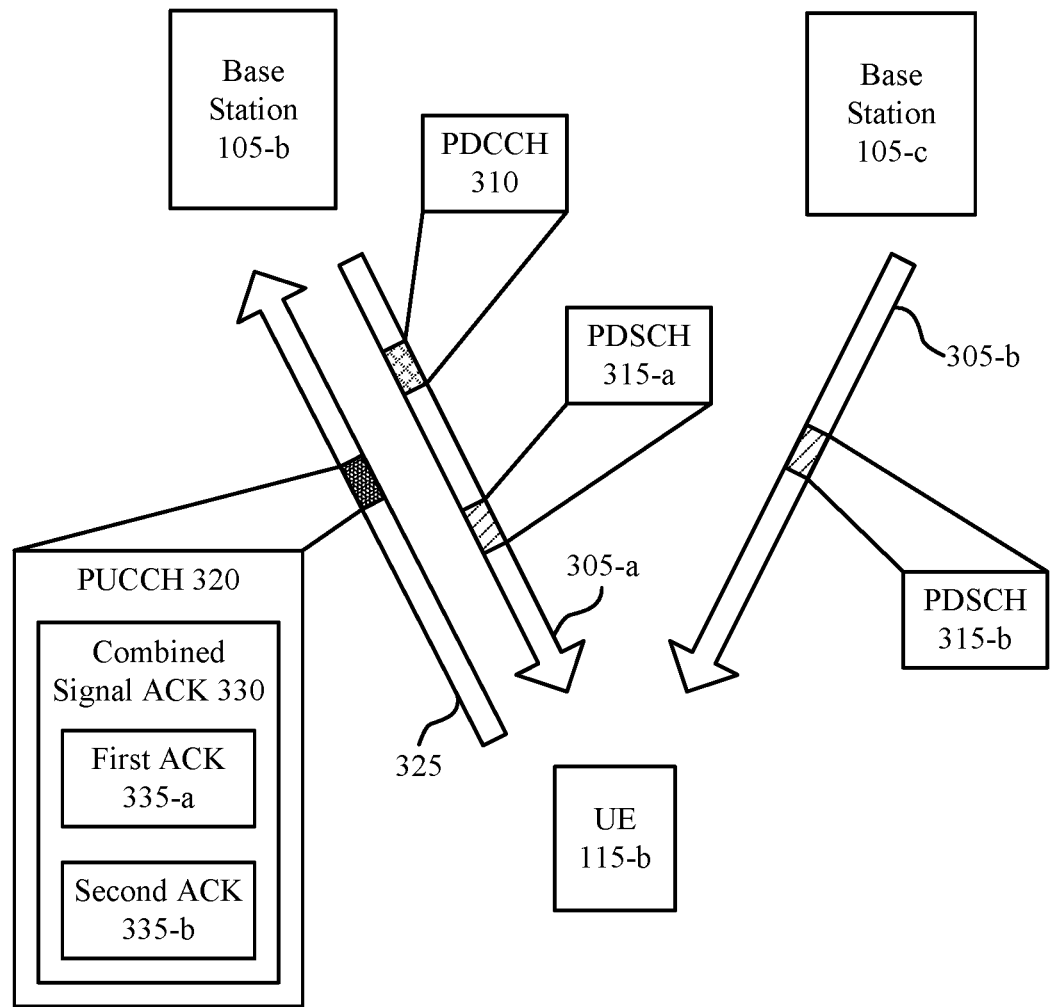
FIG. 3 illustrates an example of a multi-TRP configuration that supports acknowledgment reporting for multi-link transmissions in accordance with aspects of the present disclosure.

FIG. 3 illustrates an example of a multi-TRP configuration 300 that supports acknowledgment reporting for multi-link transmissions in accordance with aspects of the present disclosure. In some examples, multi-TRP configuration 300 may implement aspects of wireless communications systems 100, 200, 201, and 202. Multi-TRP configuration 300 may include a first base station 105-*b*, a second base station 105-*c*, and a UE 115-*b*, which may be examples of corresponding base stations 105 and UEs 115, respectively, as described with reference to FIGS. 1-2C. Additionally, the first base station 105-*b* and the second base station 105-*c* may be referred to as a first TRP and a second TRP, respectively, for multi-TRP configuration 300. In some cases, multi-TRP configuration 300 may be used for a high reliability service (e.g., URLLC) to increase the chances that a downlink transmission is successfully transmitted to UE 115-*b* by the multiple TRPs or base stations 105.

In some cases, multi-TRP configuration 300 may include a multi-link downlink transmission received at UE 115-*b* from the first base station 105-*b* and second base station 105-*c*. For example, UE 115-*b* may have a first radio link 305-*a* with the first base station 105-*b* and a second radio link 305-*b* with the second base station 105-*c* to receive downlink transmissions. The first base station 105-*b* may represent a serving base station 105, a primary cell (PCell), a master node, etc., such that the first base station 105-*b* transmits scheduling and configuration information to UE 115-*b*, and the second base station 105-*c* may represent a secondary cell (SCell), a secondary node, etc., for communications with UE 115-*b* in multi-TRP configuration 300. Accordingly, the first base station 105-*b* may transmit a physical downlink control channel (PDCCH) 310 to UE 115-*b* on the first radio link 305-*a* to indicate the configuration for the multi-link downlink transmission (e.g., information about the second base station 105-c, resources to receive the downlink transmission from each base station 105, etc.).

Subsequently, UE 115-b may receive a same downlink message on each radio link 305 from each base station 105. For example, UE 115-b may receive a first PDSCH 315-a from the first base station 105-b on the first radio link 305-a and a second PDSCH 315-b from the second base station 105-c on the second radio link 305-b, where the first PDSCH 315-a and the second PDSCH 315-b may include the same downlink information or message. In some cases, the PDSCHs 315 may include a single DCI (e.g., a common unique DCI). Additionally, an uplink-downlink beam alignment may or may not be used between UE 115-b and the respective base stations 105 for communicating the PDSCHs 315, any uplink messages, etc.

After receiving the PDSCHs 315, UE 115-b may combine the messages carried in the PDSCHs 315 to determine a final decoding result (e.g., acknowledgment feedback) for the combined signal as described previously. Additionally, as described with reference to FIG. 2, UE 115-b may also determine a phase shift to apply to the final decoding result based on if one or both of the PDSCHs 315 are unsuccessfully received (e.g., or unsuccessfully decoded). Accordingly, UE 115-b may then transmit the final decoding result for the combined signal in a PUCCH 320 on a radio link 325 to the first base station 105-b with the phase shift applied to the final decoding result. For example, PUCCH 320 may include a combined signal ACK 330 to indicate the final decoding result for the combined signal (e.g., combining the first PDSCH 315-a and the second PDSCH 315-b), and the combined signal ACK 330 may have a phase shift applied to indicate a first ACK 335-a for an individual decoding result of the first PDSCH 315-a and a second ACK 335-b for an individual decoding result of the second PDSCH 315-b. Additionally, HARQ feedback carried by PUCCH 320 (e.g., the final decoding result) may be any format, such as a one (1) bit HARQ feedback (e.g., where the one (1) bit HARQ feedback has the phase shift applied), feedback containing HARQ and demodulation reference signal (DMRS)/log-likelihood ratio (LLR) quality, etc.

In some cases, radio link 325 may be the same as the first radio link 305-a, where UE 115-b determines to transmit PUCCH 320 (e.g., carrying the phase shifted final decoding result) based on the first radio link 305-a being stronger than the second radio link 305-b, the first PDSCH 315-a being successfully received on the first radio link 305-a, or a combination thereof. Additionally or alternatively, although not shown, UE 115-b may transmit PUCCH 320 with the final decoding result and the applied phase shift on the second radio link 305-b (e.g., or a radio link corresponding to the second radio link 305-b) as well as or as an alternative to the first radio link 305-a.

Additionally, while two (2) TRPs/base stations 105 are shown for multi-TRP configuration 300, where two (2) radio links are established for the multi-link downlink transmission based on the two (2) TRPS/base stations 105, the described techniques may be extended to a higher number of TRPs/base stations 105 and corresponding radio links (e.g., as described with reference to FIG. 2 with the three (3) and four (4) radio links but may not be limited to the three (3) and four (4) radio links).

Figure 4:
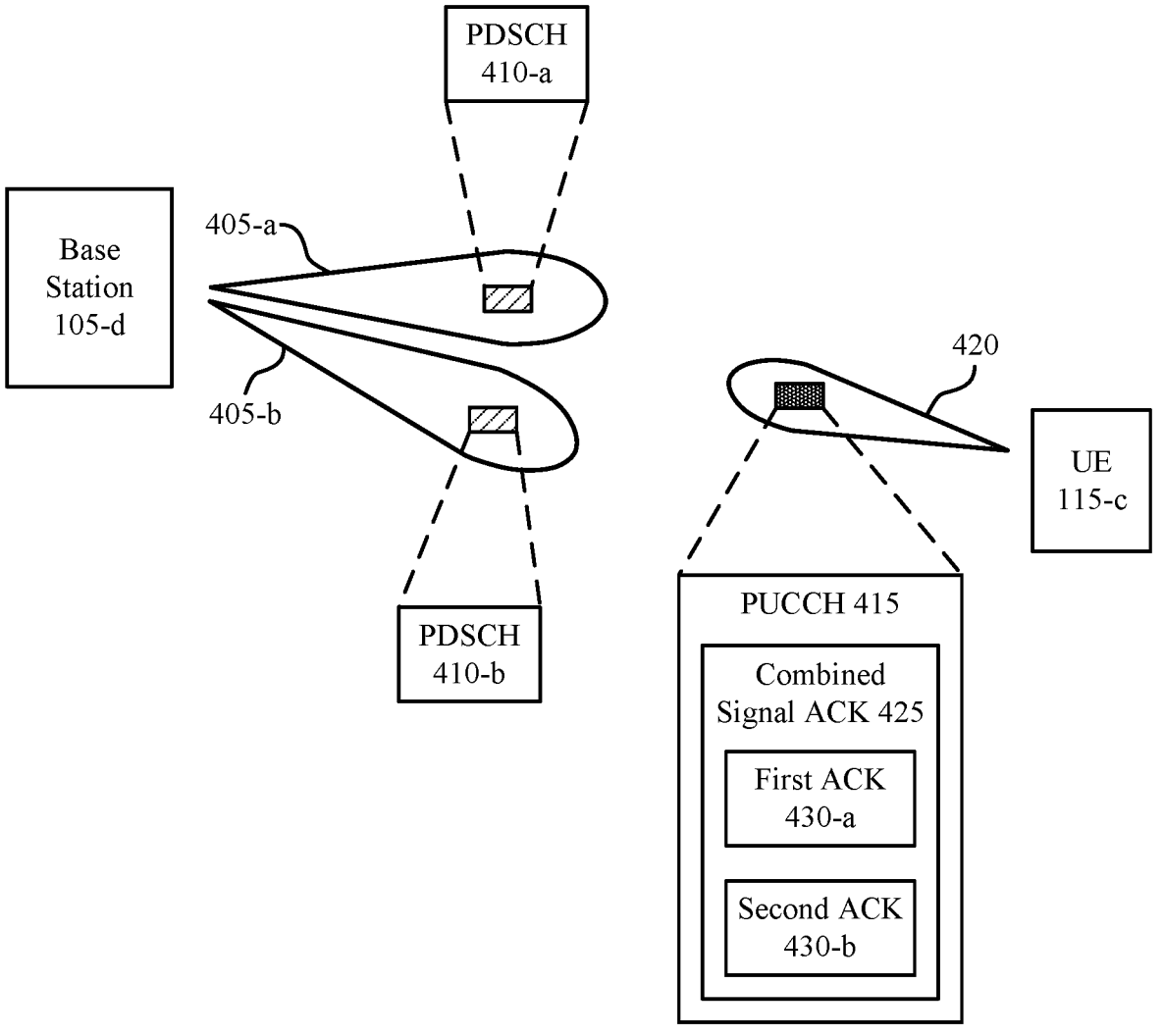
FIG. 4 illustrates an example of a multi-beam configuration that supports acknowledgment reporting for multi-link transmissions in accordance with aspects of the present disclosure.

FIG. 4 illustrates an example of a multi-beam configuration 400 that supports acknowledgment reporting for multi-link transmissions in accordance with aspects of the present disclosure. In some examples, multi-beam configuration 400 may implement aspects of wireless communications systems 100, 200, 201, and 202. Multi-beam configuration 400 may include a base station 105-d and a UE 115-c, which may be examples of corresponding base stations 105 and UEs 115, respectively, as described with reference to FIGS. 1-3.

In some cases, multi-beam configuration 400 may include a multi-link downlink transmission received at UE 115-c from base station 105-d via multiple beams. For example, UE 115-c may have a first radio link with base station 105-d via a first beam 405-a and a second radio link with base station 105-d via a second beam 405-b to receive downlink transmissions. Additionally or alternatively, although not shown, UE 115-c may have different beams configured with different base stations 105, where the downlink transmissions are received by UE 115-c via the different beams from the different base stations 105.

As described herein, UE 115-c may receive a first PDSCH 410-a via the first beam 405-a and a second PDSCH 410-b via the second beam 405-b, where UE 115-c then determines acknowledgment feedback for each PDSCH 410 as well as a combined signal determined from both PDSCHs 410. Additionally, each PDSCH 410 may be a different instance of a same downlink message transmitted to UE 115-c. UE 115-c may then transmit the acknowledgment feedback for the combined signal from both PDSCHs 410 in a PUCCH 415 with an applied phase shift that is indicative of which beams 405 (e.g., radio links) had an error (e.g., a NACK for the individual acknowledgment feedback of the individual PDSCHs 410 and beams 405). For example, PUCCH 415 may include a combined signal ACK 425 to indicate the final decoding result for the combined signal (e.g., combining the first PDSCH 410-a and the second PDSCH 410-b), and the combined signal ACK 425 may have a phase shift applied to indicate a first ACK 430-a for an individual decoding result of the first PDSCH 410-a and a second ACK 430-b for an individual decoding result of the second PDSCH 410-b. In some cases, UE 115-c may transmit PUCCH 415 carrying the phase shifted acknowledgment feedback for the combined signal on a beam 420 that may correspond to the first radio link or the second radio link (e.g., on a strongest radio link with a higher signal quality and/or power) or may transmit PUCCH 415 on two beams corresponding to the two radio links.

Additionally, while two (2) beams are shown for multi-beam configuration 400, where two (2) radio links are established for the multi-link downlink transmission based on the two (2) beams, the described techniques may be extended to a higher number of beams and corresponding radio links (e.g., as described with reference to FIG. 2 with the three (3) and four (4) radio links but may not be limited to the three (3) and four (4) radio links).

Figure 5:
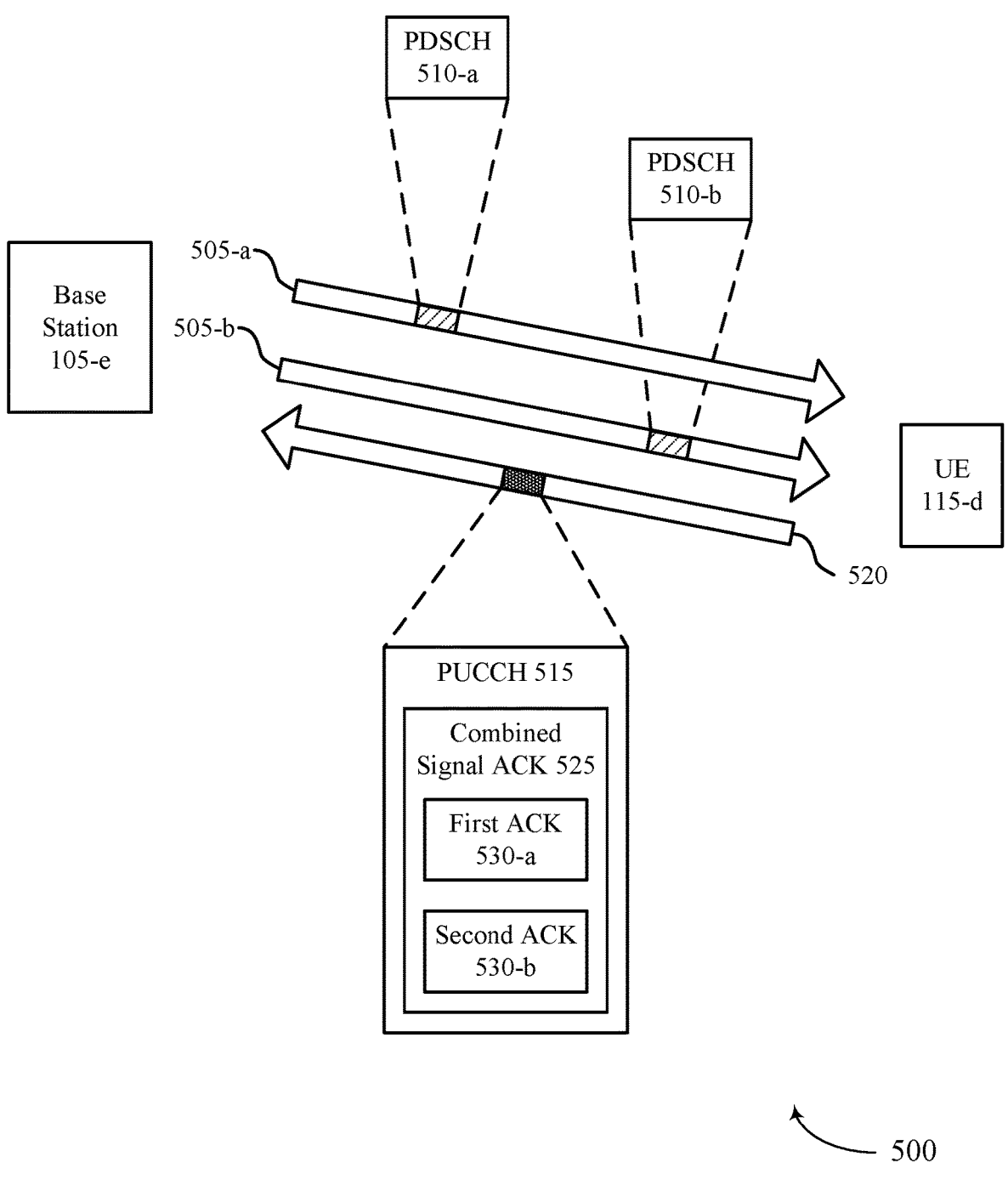
FIG. 5 illustrates an example of a CC configuration that supports acknowledgment reporting for multi-link transmissions in accordance with aspects of the present disclosure.

FIG. 5 illustrates an example of a CC configuration 500 that supports acknowledgment reporting for multi-link transmissions in accordance with aspects of the present disclosure. In some examples, CC configuration 500 may implement aspects of wireless communications systems 100, 200, 201, and 202. CC configuration 500 may include a base station 105-e and a UE 115-d, which may be examples of corresponding base stations 105 and UEs 115, respectively, as described with reference to FIGS. 1-4.

In some cases, CC configuration 500 may include a multi-link downlink transmission received at UE 115-d from base station 105-e via multiple CCs. For example, UE 115-d may have a first radio link with base station 105-e via a first CC 505-a and a second radio link with base station 105-e via a second CC 505-b to receive downlink transmissions. Additionally or alternatively, although not shown, UE 115-d may have different CCs configured with different base stations 105, where the downlink transmissions are received by UE 115-*d* via the different CCs from the different base stations 105.

As described herein, UE 115-*d* may receive a first PDSCH 510-*a* via the first CC 505-*a* and a second PDSCH 510-*b* via the second CC 505-*b*, where UE 115-*d* then determines acknowledgment feedback for each PDSCH 510 as well as a combined signal determined from both PDSCHS 510. Additionally, each PDSCH 510 may be a different instance of a same downlink message transmitted to UE 115-*d*. UE 115-*d* may then transmit the acknowledgment feedback for the combined signal from both PDSCHs 510 in a PUCCH 515 with an applied phase shift that is indicative of which CCs 505 (e.g., radio links) had an error (e.g., a NACK for the individual acknowledgment feedback of the individual PDSCHs 510 and CCs 505). For example, PUCCH 515 may include a combined signal ACK 525 to indicate the final decoding result for the combined signal (e.g., combining the first PDSCH 510-*a* and the second PDSCH 510-*b*), and the combined signal ACK 525 may have a phase shift applied to indicate a first ACK 530-*a* for an individual decoding result of the first PDSCH 510-*a* and a second ACK 530-*b* for an individual decoding result of the second PDSCH 510-*b*. In some cases, UE 115-*d* may transmit PUCCH 515 carrying the phase shifted acknowledgment feedback for the combined signal on a CC 520 that may correspond to the first radio link or the second radio link (e.g., on a strongest radio link with a higher signal quality and/or power) or may transmit PUCCH 515 on two CCs corresponding to the two radio links.

Additionally, while two (2) CCs are shown for multi-CC configuration 400, where two (2) radio links are established for the multi-link downlink transmission based on the two (2) CCs, the described techniques may be extended to a higher number of CCs and corresponding radio links (e.g., as described with reference to FIG. 2 with the three (3) and four (4) radio links but may not be limited to the three (3) and four (4) radio links).

Figure 6:
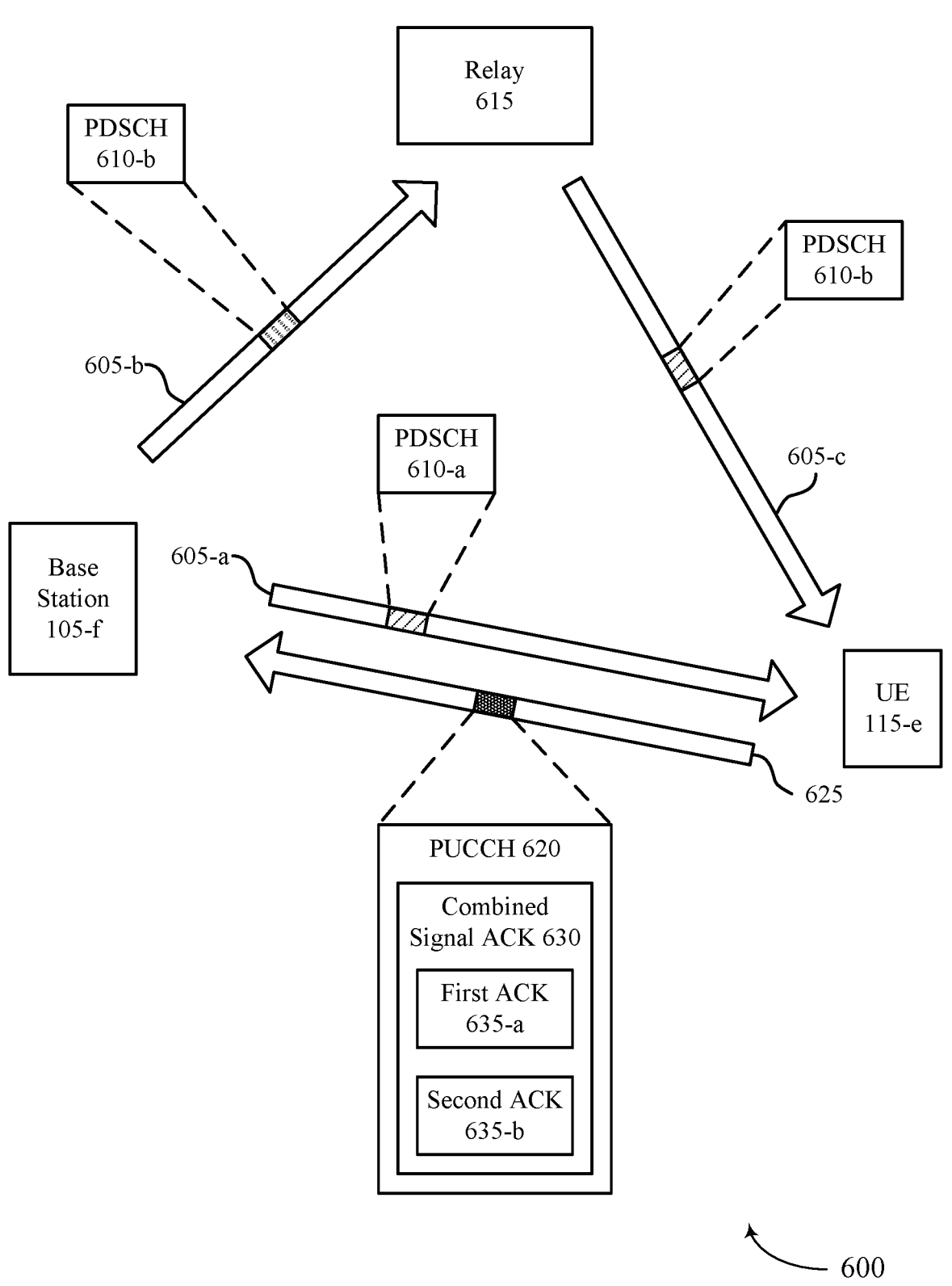
FIG. 6 illustrates an example of a relay configuration that supports acknowledgment reporting for multi-link transmissions in accordance with aspects of the present disclosure.

FIG. 6 illustrates an example of a relay configuration 600 that supports acknowledgment reporting for multi-link transmissions in accordance with aspects of the present disclosure. In some examples, relay configuration 600 may implement aspects of wireless communications systems 100, 200, 201, and 202. Relay configuration 600 may include a base station 105-*f* and a UE 115-*e*, which may be examples of corresponding base stations 105 and UEs 115, respectively, as described with reference to FIGS. 1-5. Additionally, relay configuration 600 may include a relay 615 that base station 105-*f* may use to communicate with UE 115-*e* indirectly. In some cases, relay 615 may be an additional base station 105, a relay device, an additional UE 115, a repeater, or any wireless device capable of forwarding messages between base station 105-*f* and UE 115-*e*.

In some cases, relay configuration 600 may include a multi-link downlink transmission received at UE 115-*e* from base station 105-*f* directly and indirectly via relay 615. For example, UE 115-*e* may have a first radio link 605-*a* with base station 105-*f* via a direct connection and a second radio link 605 with base station 105-*f* via an indirect connection through relay 615 that includes a radio link 605-*b* and a radio link 605-*c* to receive downlink transmissions.

As described herein, UE 115-*e* may receive a first PDSCH 610-*a* directly from base station 105-*f* via the first radio link 605-*a* and a second PDSCH 610-*b* indirectly from base station 105-*f* via the second radio link 605 (e.g., with radio links 605-*b* and 605-*c*), where UE 115-*e* then determines acknowledgment feedback for each PDSCH 610 as well as a combined signal determined from both PDSCHS 610. Additionally, each PDSCH 610 may be a different instance of a same downlink message transmitted to UE 115-*e*. UE 115-*e* may then transmit the acknowledgment feedback for the combined signal from both PDSCHs 610 in a PUCCH 620 with an applied phase shift that is indicative of which radio links 605 had an error (e.g., a NACK for the individual acknowledgment feedback of the individual PDSCHs 610 and radio links 605). For example, PUCCH 620 may include a combined signal ACK 630 to indicate the final decoding result for the combined signal (e.g., combining the first PDSCH 615-*a* and the second PDSCH 615-*b*), and the combined signal ACK 630 may have a phase shift applied to indicate a first ACK 635-*a* for an individual decoding result of the first PDSCH 615-*a* and a second ACK 635-*b* for an individual decoding result of the second PDSCH 615-*b*. In some cases, UE 115-*e* may transmit PUCCH 615 carrying the phase shifted acknowledgment feedback for the combined signal on a radio link 625 that may correspond to the first radio link 605-*a* or the second radio link 605 (e.g., on a strongest radio link with a higher signal quality and/or power) or may transmit PUCCH 620 on two radio links corresponding to the two radio links 605 (e.g., via relay 615 and directly to base station 105-*f*).

Additionally, while two (2) radio links are shown for relay configuration 600, where two (2) radio links are established for the multi-link downlink transmission based on using relay 615, the described techniques may be extended to a higher number of radio links (e.g., as described with reference to FIG. 2 with the three (3) and four (4) radio links but may not be limited to the three (3) and four (4) radio links). For example, base station 105-*f* may use multiple relays to transmit a same downlink transmission to UE 115-*e* and/or may also send multiple direct downlink transmissions to UE 115-*e* in addition to the downlink transmissions sent through one or more relay devices.

Figure 7A:
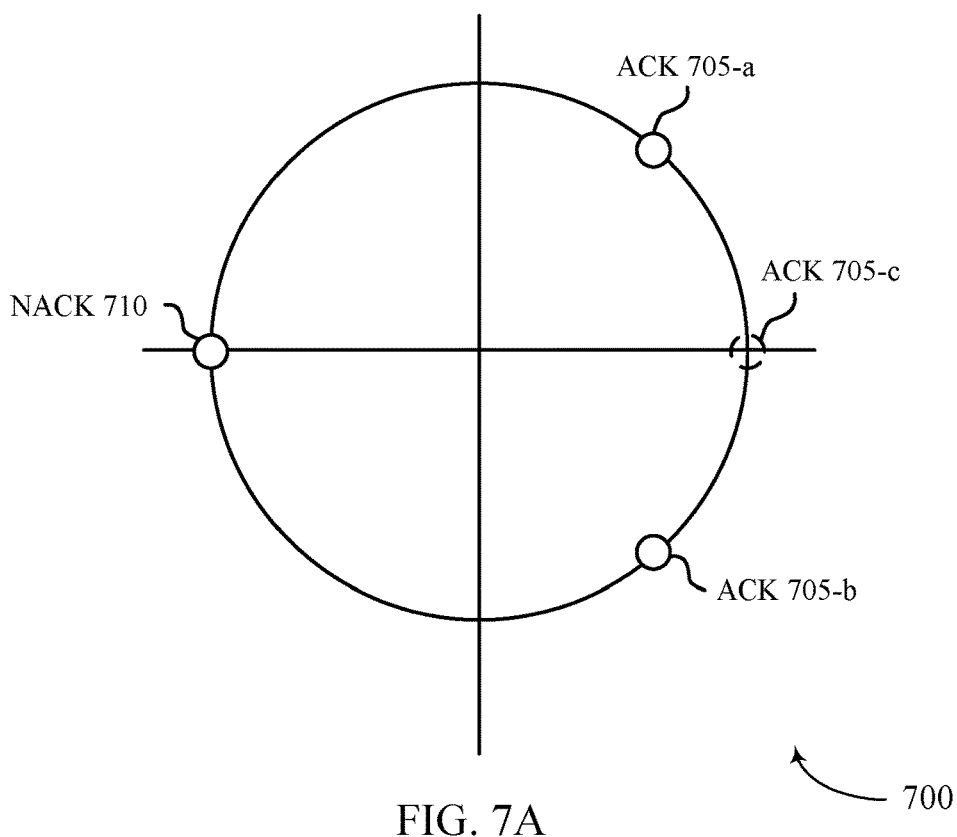
FIG. 7A illustrates an example of an information bit mapping configuration that supports acknowledgment reporting for multi-link transmissions in accordance with aspects of the present disclosure.

FIG. 7A illustrates an example of an information bit mapping configuration 700 that supports acknowledgment reporting for multi-link transmissions in accordance with aspects of the present disclosure. In some examples, information bit mapping configuration 700 may implement aspects of wireless communications system 100, wireless communications systems 200, 201, and 202, multi-TRP configuration 300, multi-beam configuration 400, CC configuration 500, and relay configuration 600.

As described previously, a UE 115 may transmit acknowledgment feedback with a phase shift to a base station 105 for a multi-link downlink transmission received on different radio links (e.g., from multiple TRPs as described above with reference to FIG. 3, on different beams as described above with reference to FIG. 4, via different CCs as described above with reference to FIG. 5, via a direct connection with a base station 105 and an indirect connection with a relay device as described above with reference to FIG. 6, etc.), where the phase shift indicates which radio links had errors. In some cases, this acknowledgment feedback may be transmitted as one (1) bit indication or may be transmitted as an indication using a higher number of bits (e.g., two (2) bits, three (3) bits, . . . , N bits).

The one (1) bit indication may be used when the modulation is a binary phase shift keying (BPSK) modulation scheme and when a PUCCH format 0 is used. However, in the case of a two (2) radio link multi-link downlink transmission, the UE 115 may inform the base station 105 (e.g., the network) of three (3) events. For example, the three (3) events may include a final acknowledgment feedback for a combined signal, an acknowledgment feedback for the other radio link not used to transmit the acknowledgment feedback (e.g., a first radio link may be used to transmit the acknowledgment feedback that indicates whether a second radio link is successful or not), and an acknowledgment feedback for both of the radio links. As such, when two (2) radio links are used for a multi-link downlink transmission and the UE 115 has three (3) events to inform to the base station 105, the UE 115 may use a two (2) information bit indication for informing the base station 105 of the three (3) events.

Additionally or alternatively, for a three (3) radio link multi-link downlink transmission, a three (3) information bit indication may be used to indicate the different possible events. For example, for three (3) radio links, the UE 115 may inform the base station 105 of five (5) events that include a final acknowledgment feedback for the combined signal, an acknowledgment feedback for one of the other two radio links not used to transmit the acknowledgment feedback (e.g., two (2) different events for the two radio links), an acknowledgment feedback for both of the other radio links not used to transmit the acknowledgment feedback, and an acknowledgment feedback for each of the three (3) radio links. As such, when three (3) radio links are used for the multi-link downlink transmission and the UE 115 has five (5) events to inform to the base station 105, the UE 115 may use a three (3) bit information bit indication for informing the base station 105 of the five (5) events.

In the case of PUCCH format 0, the two (2), three (3), etc., up to N information bits may be mapped to one (1) BPSK symbol with different shifts, and the UE 115 may transmit this one (1) BPSK symbol with the corresponding shift over the air (e.g., to the base station 105). In the case of a PUCCH format 1, a same sequence with different phase shifts may be used. Accordingly, any number of events mapped to any number of information bits may be transmitted over the air with the aid of a single symbol or via a single bit (e.g., in case of BPSK) combined with phase shifts (e.g., phase rotations) over the air. Additionally or alternatively, when using multiple information bits (e.g., two (2) or more information bits) to indicate the acknowledgment information with the phase shift, a first bit may be used to indicate the acknowledgment feedback of the combined signal, and the other bits may be used to indicate the phase shift (e.g., the phase rotations).

As shown in FIG. 7A, the UE 115 may indicate an ACK 705 or a NACK 710 for the combined signal and a phase shift for the ACK 705 or NACK 710. For example, for a two (2) radio link multi-link transmission, the UE 115 may transmit a first ACK 705-a for the combined signal with a first phase shift that indicates that only reception from the other radio link (e.g., than the radio link used to transmit the first ACK 705-a) failed using a single bit and the first phase shift (e.g., using two information bits, such as '01' or '11' where the second '1' indicates the ACK 705 for the combined signal and the '0' or '1' indicates the phase shift to signify which radio links failed). Additionally or alternatively, the UE 115 may transmit a second ACK 705-b for the combined signal with a second phase shift that indicates that reception from both radio links failed using a single bit and the second phase shift (e.g., using two information bits, such as '01' or '11' where the second '1' indicates the ACK 705 and the '0' or '1' indicates the phase shift).

A third ACK 705-c may represent an ACK transmission without a phase based on successfully reception on both radio links in addition to a successful reception (e.g., and decoding) of the combined signal, but the UE 115 may refrain from transmitting the third ACK 705-c as described with reference to FIG. 2. Additionally or alternatively, the UE 115 may transmit a NACK 710 indicating that the combined signal and each of the radio links failed, where the NACK 710 is transmitted without a phase shift or with a different phase shift than those phase shift available for the ACKs 705 (e.g., using two information bits, such as '00' or '10' where the second '0' indicates the NACK 710 for the combined signal and the '0' or '1' indicates the phase shift to signify which radio links failed). Additionally or alternatively, while different examples of the two (2) information bit indication are described above, the UE 115 may use other examples of two (2) information bit indications to inform the base station 105 of the various events (e.g., '1' indicates the NACK 710 and '0' indicates the ACK 705, '1' and '0' indicate different phase shifts and phase rotations, etc.). The example of FIG. 7 with two (2) radio links may be extended to a higher number of radio links and a higher number of bits for the ACK 705 transmissions and/or NACK 710 transmission as described previously (e.g., a higher number of bits are used to indicate different phase shifts that are indicative of which radio links failed or had errors).

Figure 7B:
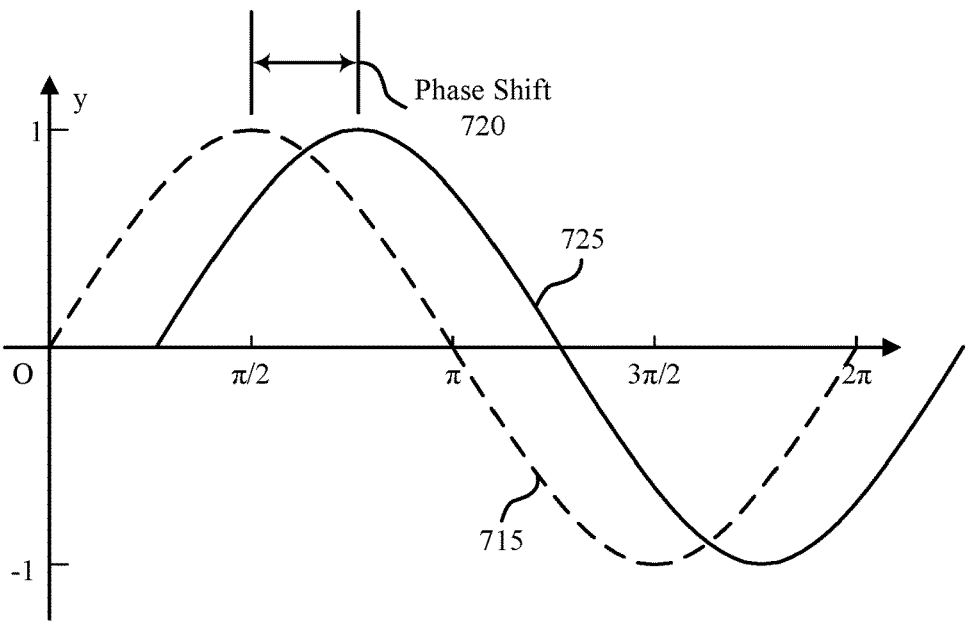
FIG. 7B illustrates an example of a phase shift configuration that supports acknowledgment reporting for multi-link transmissions in accordance with aspects of the present disclosure.

FIG. 7B illustrates an example of a phase shift configuration 701 that supports acknowledgment reporting for multi-link transmissions in accordance with aspects of the present disclosure. In some examples, phase shift configuration 701 may implement aspects of wireless communications system 100, wireless communications systems 200, 201, and 202, multi-TRP configuration 300, multi-beam configuration 400, CC configuration 500, relay configuration 600, and information bit mapping configuration 700.

As described herein, a UE 115 may transmit acknowledgment feedback with a phase shift to a base station 105 for a multi-link downlink transmission received on different radio links (e.g., from multiple TRPs as described above with reference to FIG. 3, on different beams as described above with reference to FIG. 4, via different CCs as described above with reference to FIG. 5, via a direct connection with a base station 105 and an indirect connection with a relay device as described above with reference to FIG. 6, etc.), where the phase shift indicates which radio links had errors. For example, the UE 115 may determine acknowledgment feedback for a combined signal that is a combination of multiple downlink transmissions received on the different radio links. In some examples, the acknowledgment feedback for the combined signal may be represented by a signal 715. However, the signal 715 may include the acknowledgment feedback for the combined signal alone and may not individual feedbacks for each of the multiple downlink transmissions received on the different radio links. Accordingly, the UE 115 may apply a phase shift 720 to the signal 715 to generate a different signal 725. Based on the phase shift 720, the UE 115 may indicate the individual feedbacks for each of the multiple downlink transmissions received on the different radio links and the acknowledgment feedback for the combined signal as described with reference to FIG. 7A.

Figure 8:
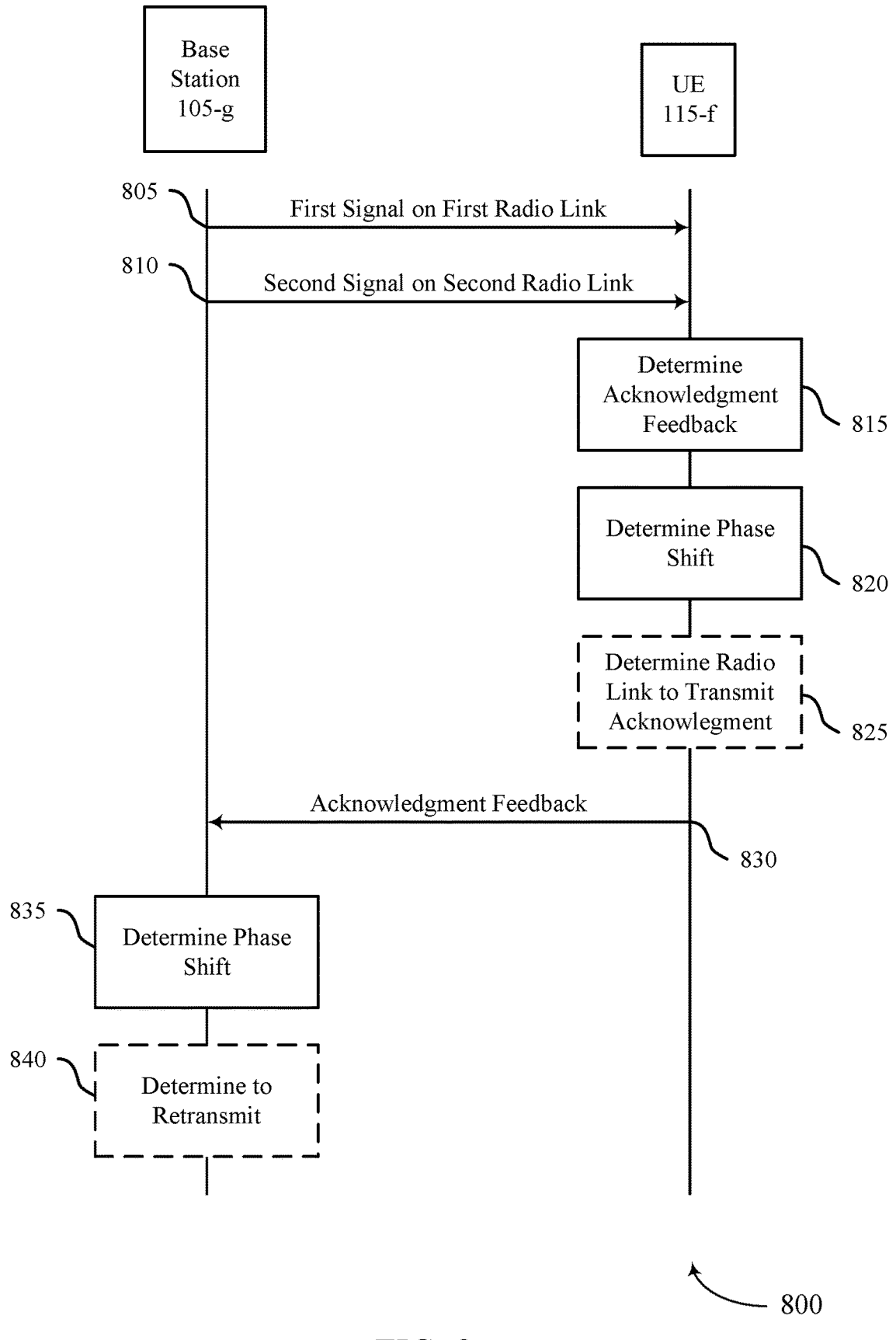
FIG. 8 illustrates an example of a process flow that supports acknowledgment reporting for multi-link transmissions in accordance with aspects of the present disclosure.

FIG. 8 illustrates an example of a process flow 800 that supports acknowledgment reporting for multi-link transmissions in accordance with aspects of the present disclosure. In some examples, process flow 800 may implement aspects of wireless communications system 100, wireless communications systems 200, 201, and 202, multi-TRP configuration 300, multi-beam configuration 400, CC configuration 500, and relay configuration 600. Process flow 800 may include a base station 105-g and a UE 115-f, which may be examples of corresponding base stations 105 and UEs 115, respectively, as described with reference to FIGS. 1-7.

In the following description of the process flow 800, the operations between base station 105-*g* and UE 115-*f* may be transmitted in a different order than the order shown, or the operations performed by base station 105-*g* and UE 115-*f* may be performed in different orders or at different times. Some operations may also be left out of the process flow 800, or other operations may be added to the process flow 800. It is to be understood that while base station 105-*g* and UE 115-*f* are shown performing a number of the operations of process flow 800, any wireless device may perform the operations shown.

At 805, UE 115-*f* may receive a first signal on a first radio link. Additionally, at 810, UE 115-*f* may receive a second signal on a second radio link. In some cases, the first radio link and the second radio link may include separate beams, radio links via CCs, radio links with separate TRPs, or a combination thereof. For example, base station 105-*g* may transmit, to UE 115-*g*, a first signal on a first radio link and a second signal on a second radio link (e.g., where the first radio link and the second radio link may include separate beams, radio links via CCs, or a combination thereof).

At 815, UE 115-*f* may determine acknowledgment feedback for the first signal, for the second signal, and for a combined signal, the combined signal being a combination of the first signal and the second signal.

At 820, UE 115-*f* may determine a phase shift for transmitting the acknowledgment feedback of the combined signal, where the phase shift is based on the acknowledgment feedback of the first signal and the acknowledgment feedback of the second signal. In some cases, UE 115-*f* may determine the first signal is unsuccessfully received, decoded, or both; the second signal is unsuccessfully received, decoded, or both; and the combined signal is unsuccessfully received, decoded, or both, where the determined phase shift is zero (0) based on unsuccessfully receiving and/or decoding the first signal, the second signal, and the combined signal. Additionally or alternatively, UE 115-*f* may determine the first signal is unsuccessfully received, decoded, or both; the second signal is unsuccessfully received, decoded, or both; and the combined signal is unsuccessfully received, decoded, or both, where the determined phase shift is based on unsuccessfully receiving and/or decoding the first signal, the second signal, and the combined signal and this determined phase shift is different than a phase shift option for a successful reception and decoding of the combined signal.

Additionally, the phase shift may be based on whether the first signal is successfully received and decoded and whether the second signal is successfully received and decoded. Subsequently, the phase shift may be applied to the acknowledgment feedback of the combined signal based on the first signal or the second signal being successfully received and decoded.

At 825, UE 115-*f* may determine to transmit the acknowledgment feedback of the combined signal on the first radio link or the second radio link based on a first signal quality of the first radio link, a second signal quality of the second radio link, or both. For example, the acknowledgment feedback of the combined signal may be transmitted on the first radio link based on the first signal quality being higher than the second signal quality, or the acknowledgment feedback of the combined signal may be transmitted on the second radio link based on the second signal quality being higher than the first signal quality.

In some cases, UE 115-*f* may determine to transmit the acknowledgment feedback of the combined signal on the first radio link based on the first signal being successfully received and decoded or may determine to transmit the acknowledgment feedback of the combined signal on the second radio link based on the second signal being successfully received and decoded. Alternatively, UE 115-*f* may determine to transmit the acknowledgment feedback of the combined signal on the first radio link based on the first signal being unsuccessfully received, decoded, or both or may determine to transmit the acknowledgment feedback of the combined signal on the second radio link based on the second signal being unsuccessfully received, decoded, or both. Additionally or alternatively, UE 115-*f* may determine to transmit the acknowledgment feedback of the combined signal on the first radio link and on the second radio link.

At 830, UE 115-*f* may transmit the acknowledgment feedback of the combined signal in accordance with the determined phase shift. For example, base station 105-*g* may receive the acknowledgment feedback of the combined signal on the first radio link, the second radio link, or both. In some cases, UE 115-*f* may determine to transmit the acknowledgment feedback of the combined signal based on the first signal being unsuccessfully received, decoded, or both; the second signal being unsuccessfully received, decoded, or both; or both signals being unsuccessfully received, decoded, or both (e.g., at least one radio link is erroneous). Additionally or alternatively, UE 115-*f* may determine the first signal is successfully received and decoded and the second signal is successfully received and decoded and, as such, may refrain from transmitting the acknowledgment feedback of the combined signal based on successfully receiving and decoding the first signal and the second signal.

In some cases, UE 115-*f* may receive an additional signal on an additional radio link and may determine acknowledgment feedback for the additional signal, where the phase shift is based on the acknowledgment feedback for the additional signal and the acknowledgment feedback of the combined signal is transmitted based on the additional signal.

At 835, base station 105-*g* may determine a phase shift for the acknowledgment feedback of the combined signal, where the phase shift indicates the first signal, the second signal, or both are unsuccessfully received, decoded, or both at UE 115-*f*. For example, base station 105-*g* may determine the first signal is unsuccessfully received, decoded, or both at UE 115-*f*, the second signal is unsuccessfully received, decoded, or both at UE 115-*f*, and the combined signal is unsuccessfully received, decoded, or both at UE 115-*f* based on identifying the phase shift is zero (0) or a value indicative of the first signal, the second signal, and the combined signal being unsuccessfully received, decoded, or both at the UE (e.g., all NACKs).

At 840, base station 105-*g* may determine to retransmit the first signal on the first radio link or the second signal on the second radio link based on the determined phase shift.

Figure 9:
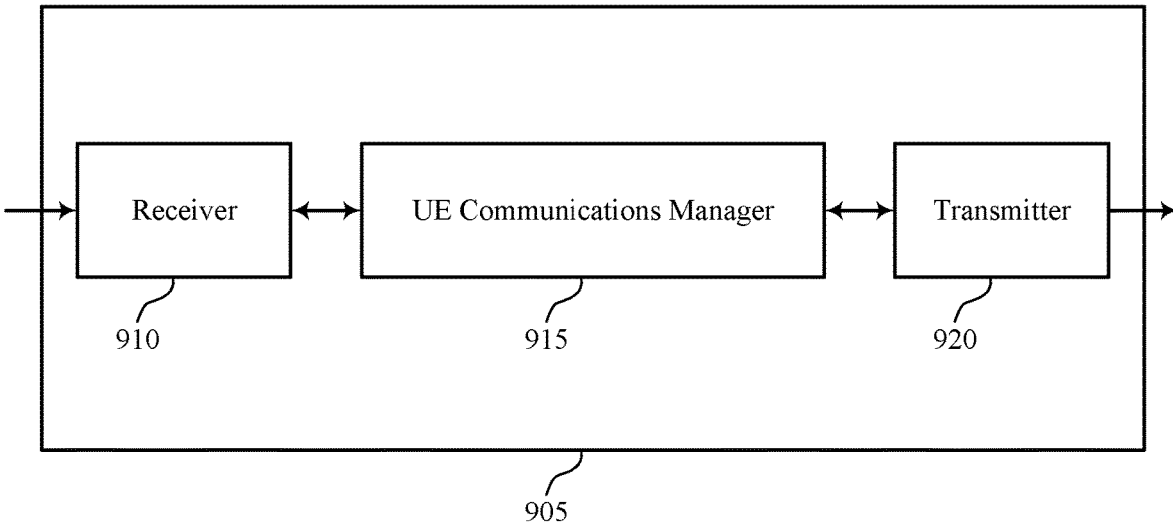
FIGS. 9 and 10 show block diagrams of devices that support acknowledgment reporting for multi-link transmissions in accordance with aspects of the present disclosure.

FIG. 9 shows a block diagram 900 of a device 905 that supports acknowledgment reporting for multi-link transmissions in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to acknowledgment reporting for multi-link transmissions, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may receive a first signal on a first radio link and a second signal on a second radio link. In some cases, the UE communications manager 915 may determine acknowledgment feedback for the first signal, for the second signal, and for a combined signal, the combined signal being a combination of the first signal and the second signal. Additionally, the UE communications manager 915 may determine a phase shift for transmitting the acknowledgment feedback of the combined signal, the phase shift being based on the acknowledgment feedback of the first signal and the acknowledgment feedback of the second signal. Subsequently, the UE communications manager 915 may transmit the acknowledgment feedback of the combined signal in accordance with the determined phase shift. The UE communications manager 915 may be an example of aspects of the UE communications manager 1210 described herein.

In some examples, the UE communications manager 915 of the device 905 as described herein may be implemented to realize one or more potential advantages. For example, transmitting the single acknowledgment feedback for the combined signal with the determine phase shift may decrease signaling overhead for the device 905 by reducing the amount of acknowledgment feedback. Previously, the device 905 may have transmitted acknowledgment messages for each radio link and for the combined signal, thereby increasing the amount of signaling transmitted by the device 905. Transmitting the single acknowledgment feedback may combine these multiple acknowledgment messages into one message, thereby saving power consumption associated with the extra signaling overhead from transmitting the multiple acknowledgment messages individually.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
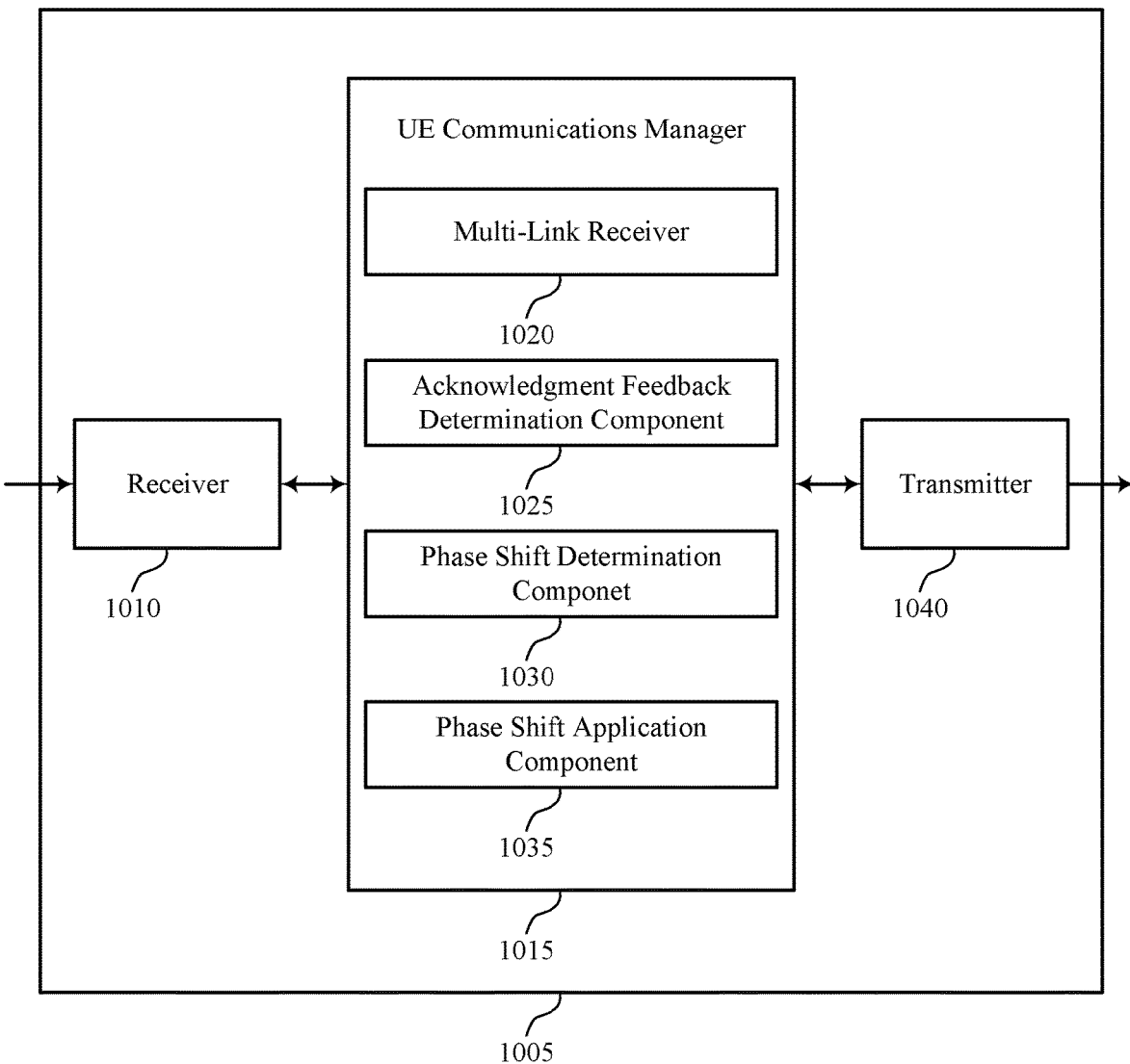

FIG. 10 shows a block diagram 1000 of a device 1005 that supports acknowledgment reporting for multi-link transmissions in accordance with aspects of the present disclosure. The device 1005 may be an example of aspects of a device 905, or a UE 115 as described herein. The device 1005 may include a receiver 1010, a UE communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to acknowledgment reporting for multi-link transmissions, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a multi-link receiver 1020, an acknowledgment feedback determination component 1025, a phase shift determination component 1030, and a phase shift application component 1035. The UE communications manager 1015 may be an example of aspects of the UE communications manager 1210 described herein.

The multi-link receiver 1020 may receive a first signal on a first radio link and a second signal on a second radio link.

The acknowledgment feedback determination component 1025 may determine acknowledgment feedback for the first signal, for the second signal, and for a combined signal, the combined signal being a combination of the first signal and the second signal.

The phase shift determination component 1030 may determine a phase shift for transmitting the acknowledgment feedback of the combined signal, the phase shift being based on the acknowledgment feedback of the first signal and the acknowledgment feedback of the second signal.

The phase shift application component 1035 may transmit the acknowledgment feedback of the combined signal in accordance with the determined phase shift.

Based on techniques for determining the phase shift and transmitting the acknowledgment feedback in accordance with the determines phase shift, a processor of the device 1005 (e.g., controlling the receiver 1010, the transmitter 1040, or the transceiver 1220 as described with reference to FIG. 12) may save battery life and processing power by not configuring multiple, individual feedback messages for each radio link. Additionally, the processor may increase feedback robustness for the acknowledgment feedback by indicating the feedbacks for each of the radio links in the acknowledgment feedback for the combined signal. Additionally, the processor may provide faster beam adaptation based on transmitting the acknowledgment feedback in accordance with the phase shift by reducing the transmissions back and forth to determine/refine a beam.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
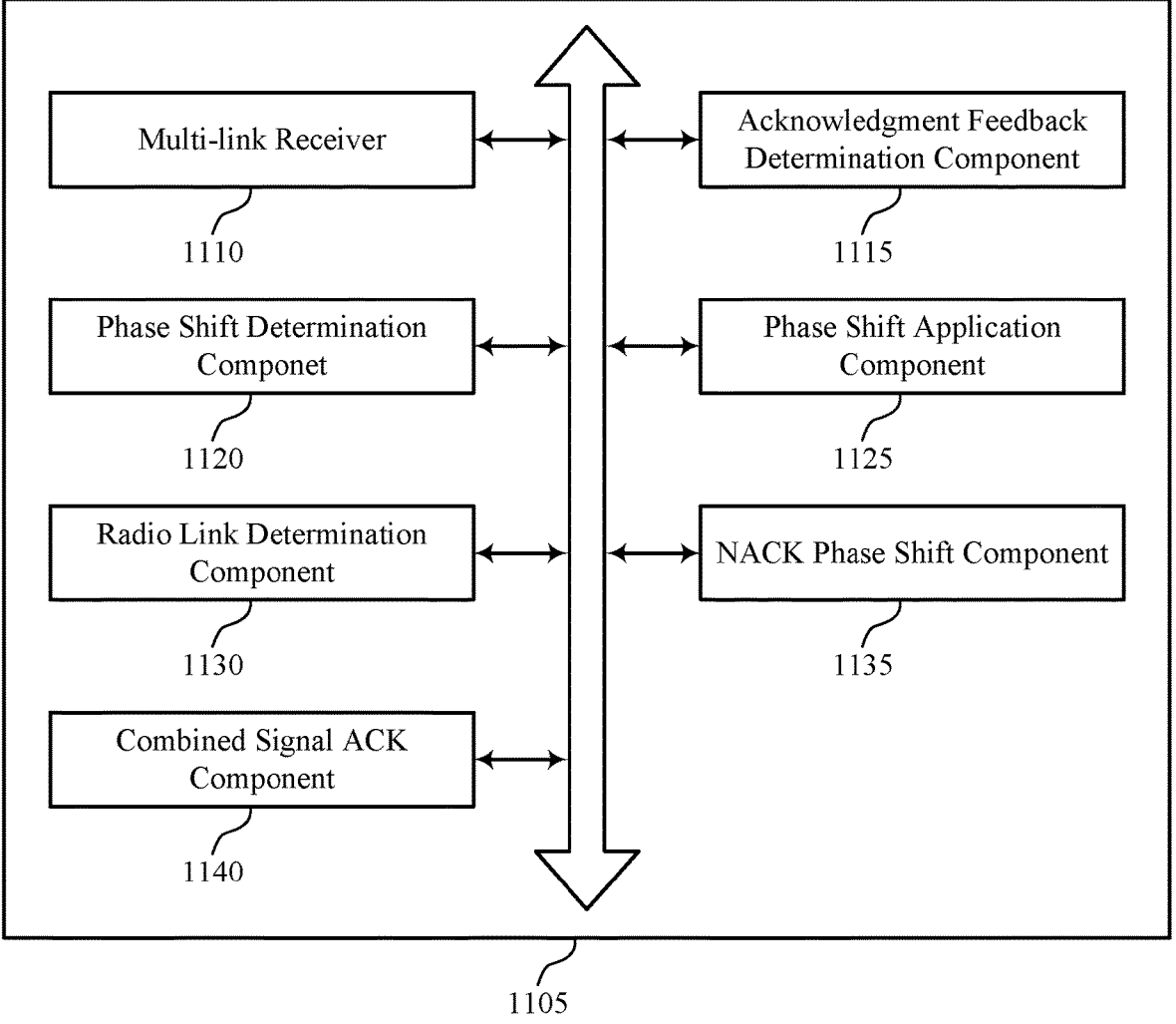
FIG. 11 shows a block diagram of a UE communications manager that supports acknowledgment reporting for multi-link transmissions in accordance with aspects of the present disclosure.

FIG. 11 shows a block diagram 1100 of a UE communications manager 1105 that supports acknowledgment reporting for multi-link transmissions in accordance with aspects of the present disclosure. The UE communications manager 1105 may be an example of aspects of a UE communications manager 915, a UE communications manager 1015, or a UE communications manager 1210 described herein. The UE communications manager 1105 may include a multi-link receiver 1110, an acknowledgment feedback determination component 1115, a phase shift determination component 1120, a phase shift application component 1125, a radio link determination component 1130, a NACK phase shift component 1135, and a combined signal ACK component 1140. Each of these modules may communicate, directly or indirectly, with one another (e.g., via one or more buses).

The multi-link receiver 1110 may receive a first signal on a first radio link and a second signal on a second radio link. In some cases, the first radio link and the second radio link may include separate beams, radio links via CCs, radio links with separate TRPs, or a combination thereof.

The acknowledgment feedback determination component 1115 may determine acknowledgment feedback for the first signal, for the second signal, and for a combined signal, the combined signal being a combination of the first signal and the second signal.

The phase shift determination component 1120 may determine a phase shift for transmitting the acknowledgment feedback of the combined signal, the phase shift being based on the acknowledgment feedback of the first signal and the acknowledgment feedback of the second signal. In some cases, the phase shift may be based on whether the first signal is successfully received and decoded and whether the second signal is successfully received and decoded.

The phase shift application component 1125 may transmit the acknowledgment feedback of the combined signal in accordance with the determined phase shift. In some examples, the phase shift application component 1125 may receive an additional signal on an additional radio link and may determine additional acknowledgment feedback for the additional signal, where the phase shift is based on the additional acknowledgment feedback for the additional signal and the acknowledgment feedback of the combined signal is transmitted based on the additional signal. Additionally, the phase shift application component 1125 may determine to transmit the acknowledgment feedback of the combined signal based on the first signal being unsuccessfully received, decoded, or both, the second signal being unsuccessfully received, decoded, or both, or both signals being unsuccessfully received, decoded, or both. In some cases, the phase shift may be applied to the acknowledgment feedback of the combined signal based on the first signal or the second signal being successfully received and decoded.

The radio link determination component 1130 may determine to transmit the acknowledgment feedback of the combined signal on the first radio link or the second radio link based on a first signal quality of the first radio link, a second signal quality of the second radio link, or both. For example, the acknowledgment feedback of the combined signal may be transmitted on the first radio link based on the first signal quality being higher than the second signal quality, or the acknowledgment feedback of the combined signal may be transmitted on the second radio link based on the second signal quality being higher than the first signal quality.

In some examples, the radio link determination component 1130 may determine to transmit the acknowledgment feedback of the combined signal on the first radio link based on the first signal being successfully received and decoded or to transmit the acknowledgment feedback of the combined signal on the second radio link based on the second signal being successfully received and decoded. Additionally or alternatively, the radio link determination component 1130 may determine to transmit the acknowledgment feedback of the combined signal on the first radio link based on the first signal being unsuccessfully received, decoded, or both or to transmit the acknowledgment feedback of the combined signal on the second radio link based on the second signal being unsuccessfully received, decoded, or both. Additionally or alternatively, the radio link determination component 1130 may determine to transmit the acknowledgment feedback of the combined signal on the first radio link and on the second radio link.

The NACK phase shift component 1135 may determine the first signal is unsuccessfully received, decoded, or both, the second signal is unsuccessfully received, decoded, or both, and the combined signal is unsuccessfully received, decoded, or both, where the determined phase shift is zero based on unsuccessfully receiving, decoding, or both the first signal, the second signal, and the combined signal. Additionally or alternatively, the NACK phase shift component 1135 may determine the first signal is unsuccessfully received, decoded, or both, the second signal is unsuccessfully received, decoded, or both, and the combined signal is unsuccessfully received, decoded, or both, where the determined phase shift is based on unsuccessfully receiving, decoding, or both the first signal, the second signal, and the combined signal and where the determined phase shift is different than a phase shift option for a successful reception and decoding of the combined signal.

The combined signal ACK component 1140 may determine the first signal is successfully received and decoded and the second signal is successfully received and decoded. Subsequently, the combined signal ACK component 1140 may refrain from transmitting the acknowledgment feedback of the combined signal based on successfully receiving and decoding the first signal and the second signal.

Figure 12:
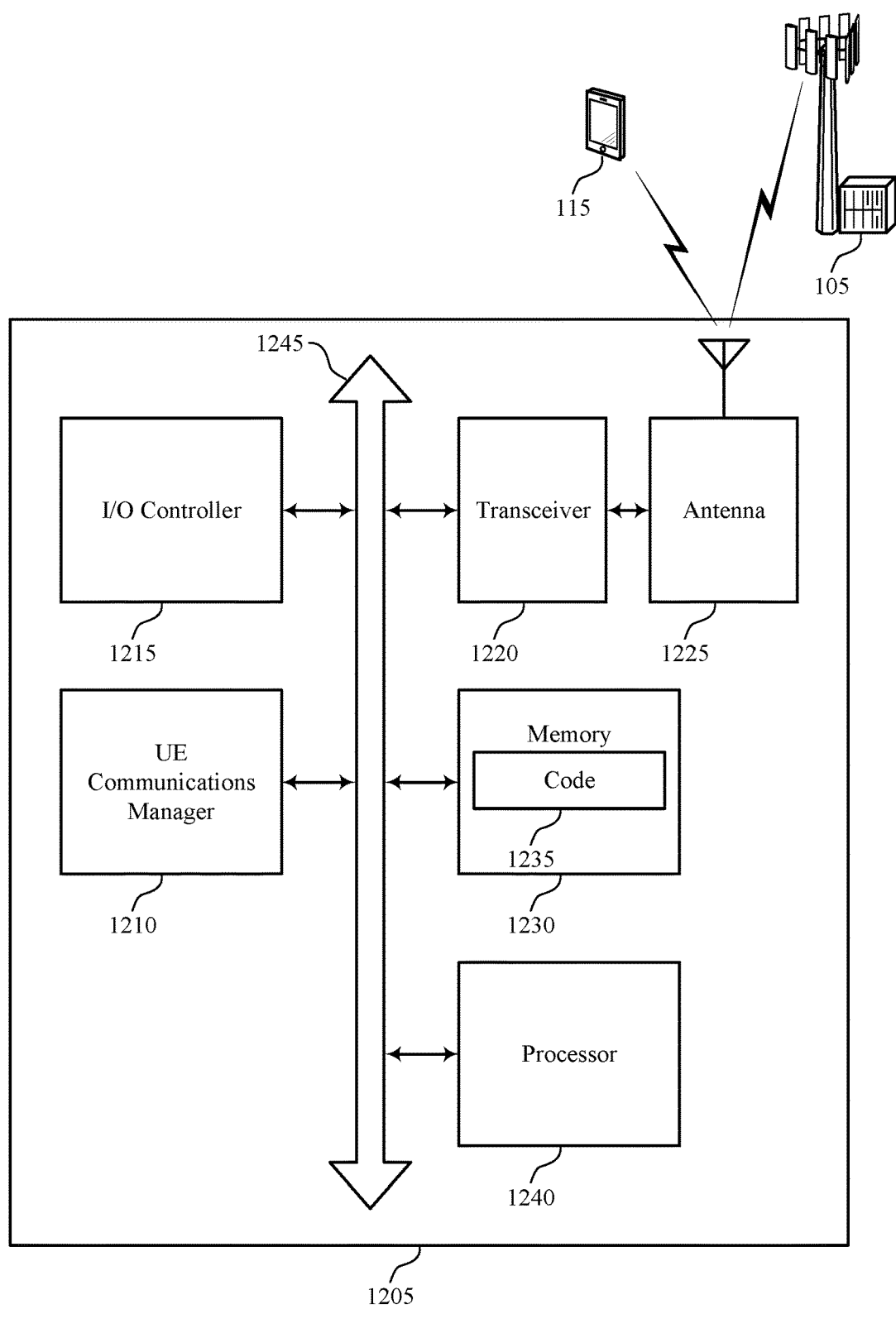
FIG. 12 shows a diagram of a system including a device that supports acknowledgment reporting for multi-link transmissions in accordance with aspects of the present disclosure.

FIG. 12 shows a diagram of a system 1200 including a device 1205 that supports acknowledgment reporting for multi-link transmissions in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may receive a first signal on a first radio link and a second signal on a second radio link. In some cases, the UE communications manager 1210 may determine acknowledgment feedback for the first signal, for the second signal, and for a combined signal, the combined signal being a combination of the first signal and the second signal. Additionally, the UE communications manager 1210 may determine a phase shift for transmitting the acknowledgment feedback of the combined signal, the phase shift being based on the acknowledgment feedback of the first signal and the acknowledgment feedback of the second signal. Subsequently, the UE communications manager 1210 may transmit the acknowledgment feedback of the combined signal in accordance with the determined phase shift.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting acknowledgment reporting for multi-link transmissions).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a block diagram 1300 of a device 1305 that supports acknowledgment reporting for multi-link transmissions in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to acknowledgment reporting for multi-link transmissions, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may transmit, to a UE, a first signal on a first radio link and a second signal on a second radio link. In some cases, the base station communications manager 1315 may receive, from the UE, acknowledgment feedback of a combined signal that is a combination of the first signal and the second signal. Additionally, the base station communications manager 1315 may determine a phase shift for the acknowledgment feedback of the combined signal, the phase shift indicating the first signal, the second signal, or both are unsuccessfully received, decoded, or both at the UE (e.g., the phase shift indicates a first acknowledgment feedback for the first signal and a second acknowledgment feedback for the second signal). The base station communications manager 1315 may be an example of aspects of the base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
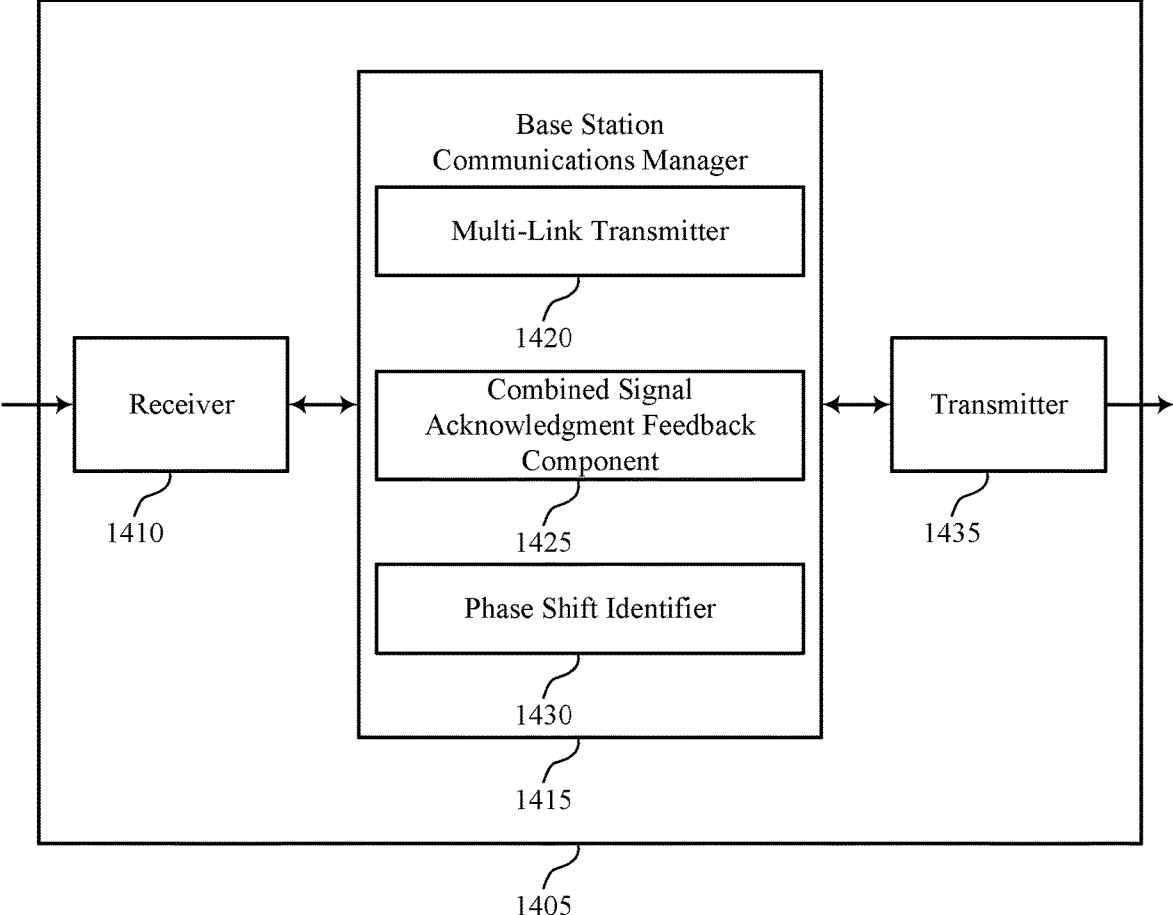

FIG. 14 shows a block diagram 1400 of a device 1405 that supports acknowledgment reporting for multi-link transmissions in accordance with aspects of the present disclosure. The device 1405 may be an example of aspects of a device 1305, or a base station 105 as described herein. The device 1405 may include a receiver 1410, a base station communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to acknowledgment reporting for multi-link transmissions, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a multi-link transmitter 1420, a combined signal acknowledgment feedback component 1425, and a phase shift identifier 1430. The base station communications manager 1415 may be an example of aspects of the base station communications manager 1610 described herein.

The multi-link transmitter 1420 may transmit, to a UE, a first signal on a first radio link and a second signal on a second radio link.

The combined signal acknowledgment feedback component 1425 may receive, from the UE, acknowledgment feedback of a combined signal that is a combination of the first signal and the second signal.

The phase shift identifier 1430 may determine a phase shift for the acknowledgment feedback of the combined signal, the phase shift indicating the first signal, the second signal, or both are unsuccessfully received, decoded, or both at the UE (e.g., the phase shift indicates a first acknowledgment feedback for the first signal and a second acknowledgment feedback for the second signal).

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
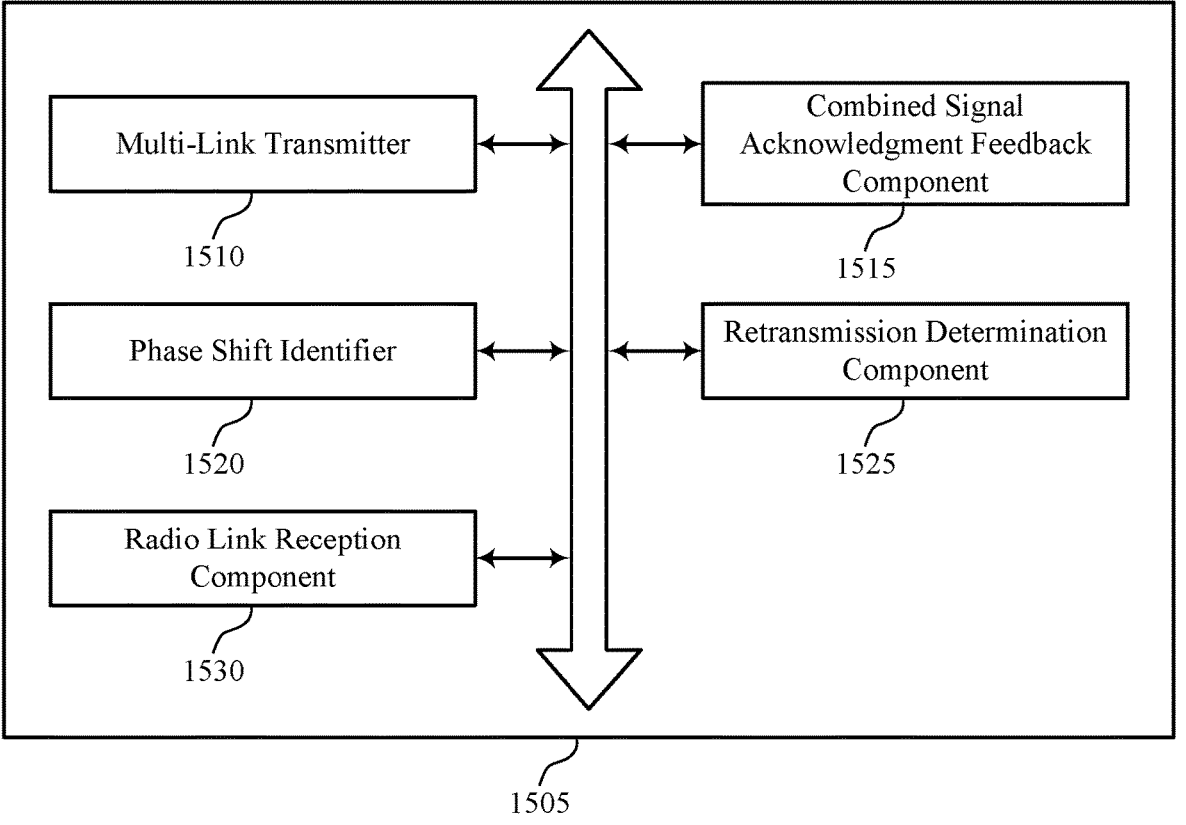
FIG. 15 shows a block diagram of a base station communications manager that supports acknowledgment reporting for multi-link transmissions in accordance with aspects of the present disclosure.

FIG. 15 shows a block diagram 1500 of a base station communications manager 1505 that supports acknowledgment reporting for multi-link transmissions in accordance with aspects of the present disclosure. The base station communications manager 1505 may be an example of aspects of a base station communications manager 1315, a base station communications manager 1415, or a base station communications manager 1610 described herein. The base station communications manager 1505 may include a multi-link transmitter 1510, a combined signal acknowledgment feedback component 1515, a phase shift identifier 1520, a retransmission determination component 1525, and a radio link reception component 1530. Each of these modules may communicate, directly or indirectly, with one another (e.g., via one or more buses).

The multi-link transmitter 1510 may transmit, to a UE, a first signal on a first radio link and a second signal on a second radio link. In some cases, the first radio link and the second radio link may include separate beams, radio links via CCs, or a combination thereof.

The combined signal acknowledgment feedback component 1515 may receive, from the UE, acknowledgment feedback of a combined signal that is a combination of the first signal and the second signal.

The phase shift identifier 1520 may determine a phase shift for the acknowledgment feedback of the combined signal, the phase shift indicating the first signal, the second signal, or both are unsuccessfully received, decoded, or both at the UE (e.g., the phase shift indicates a first acknowledgment feedback for the first signal and a second acknowledgment feedback for the second signal). In some examples, the phase shift identifier 1520 may determine the first signal is unsuccessfully received, decoded, or both at the UE, the second signal is unsuccessfully received, decoded, or both at the UE, and the combined signal is unsuccessfully received, decoded, or both at the UE based on determining the phase shift is zero or a value indicative of the first signal, the second signal, and the combined signal being unsuccessfully received, decoded, or both at the UE. Additionally, the phase shift identifier 1520 may transmit, to the UE, an additional signal on an additional radio link, where the acknowledgment feedback of the combined signal is received based on the additional signal and where the phase shift indicates whether the additional signal is successfully received and decoded at the UE.

The retransmission determination component 1525 may determine to retransmit the first signal on the first radio link or the second signal on the second radio link based on the determined phase shift.

The radio link reception component 1530 may receive the acknowledgment feedback of the combined signal on the first radio link, the second radio link, or both. In some cases, the acknowledgment feedback of the combined signal may be received on the first radio link based on the first signal being successfully received and decoded at the UE or on the second radio link based on the first signal being successfully received and decoded at the UE. Additionally or alternatively, the acknowledgment feedback of the combined signal may be received on the first radio link based on the first signal being unsuccessfully received, decoded, or both at the UE, on the second radio link based on the second signal being unsuccessfully received, decoded, or both at the UE, or on the first radio link and the second radio link based on the first signal and the second signal being unsuccessfully received, decoded, or both at the UE.

Figure 16:
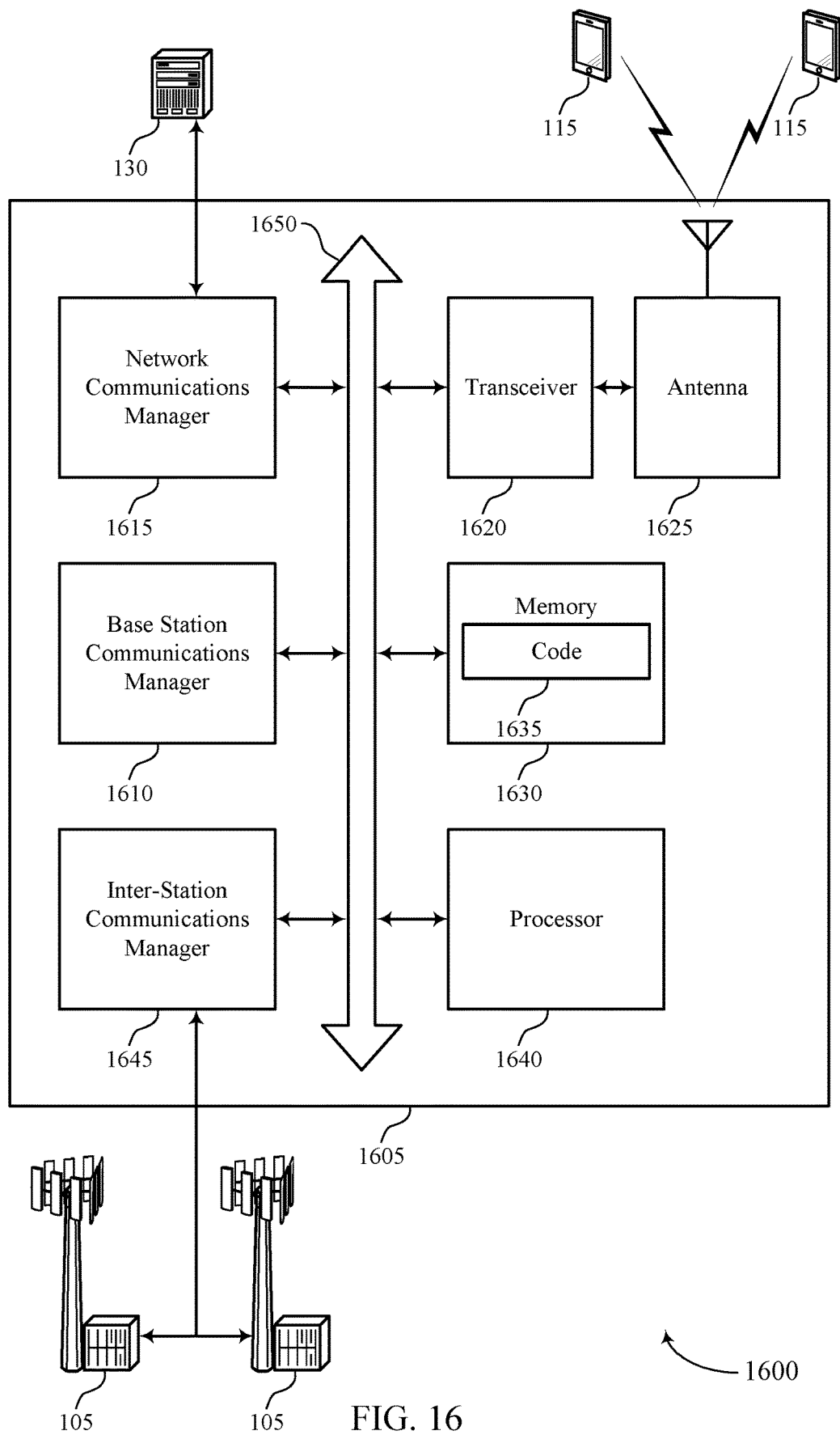
FIG. 16 shows a diagram of a system including a device that supports acknowledgment reporting for multi-link transmissions in accordance with aspects of the present disclosure.

FIG. 16 shows a diagram of a system 1600 including a device 1605 that supports acknowledgment reporting for multi-link transmissions in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The base station communications manager 1610 may transmit, to a UE, a first signal on a first radio link and a second signal on a second radio link. In some cases, the base station communications manager 1610 may receive, from the UE, acknowledgment feedback of a combined signal that is a combination of the first signal and the second signal. Additionally, the base station communications manager 1610 may determine a phase shift for the acknowledgment feedback of the combined signal, the phase shift indicating the first signal, the second signal, or both are unsuccessfully received, decoded, or both at the UE (e.g., the phase shift indicates a first acknowledgment feedback for the first signal and a second acknowledgment feedback for the second signal).

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting acknowledgment reporting for multi-link transmissions).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

FIG. 17 shows a flowchart illustrating a method 1700 that supports acknowledgment reporting for multi-link transmissions in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive a first signal on a first radio link and a second signal on a second radio link. The operations of 1705 may be performed according to the methods described herein. In some examples, aspects of the operations of 1705 may be performed by a multi-link receiver as described with reference to FIGS. 9 through 12.

At 1710, the UE may transmit acknowledgment feedback of a combined signal in accordance with a phase shift, the combined signal being a combination of the first signal and the second signal, and the phase shift determined based on a first acknowledgment feedback of the first signal and a second acknowledgment feedback of the second signal. The operations of 1710 may be performed according to the methods described herein. In some examples, aspects of the operations of 1710 may be performed by a phase shift application component as described with reference to FIGS. 9 through 12.

FIG. 18 shows a flowchart illustrating a method 1800 that supports acknowledgment reporting for multi-link transmissions in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive a first signal on a first radio link and a second signal on a second radio link. The operations of 1805 may be performed according to the methods described herein. In some examples, aspects of the operations of 1805 may be performed by a multi-link receiver as described with reference to FIGS. 9 through 12.

At 1810, the UE may determine to transmit acknowledgment feedback of a combined signal on the first radio link or the second radio link based on a first signal quality of the first radio link, a second signal quality of the second radio link, or both. The operations of 1810 may be performed according to the methods described herein. In some examples, aspects of the operations of 1810 may be performed by a radio link determination component as described with reference to FIGS. 9 through 12.

At 1815, the UE may transmit the acknowledgment feedback of the combined signal in accordance with a phase shift, the combined signal being a combination of the first signal and the second signal, and the phase shift determined based on a first acknowledgment feedback of the first signal and a second acknowledgment feedback of the second signal. The operations of 1815 may be performed according to the methods described herein. In some examples, aspects of the operations of 1815 may be performed by a phase shift application component as described with reference to FIGS. 9 through 12.

FIG. 19 shows a flowchart illustrating a method 1900 that supports acknowledgment reporting for multi-link transmissions in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive a first signal on a first radio link and a second signal on a second radio link. The operations of 1905 may be performed according to the methods described herein. In some examples, aspects of the operations of 1905 may be performed by a multi-link receiver as described with reference to FIGS. 9 through 12.

At 1910, the UE may determine to transmit acknowledgment feedback of a combined signal based on the first signal being unsuccessfully received, decoded, or both, the second signal being unsuccessfully received, decoded, or both, or both signals being unsuccessfully received, decoded, or both. The operations of 1910 may be performed according to the methods described herein. In some examples, aspects of the operations of 1910 may be performed by a phase shift application component as described with reference to FIGS. 9 through 12.

At 1915, the UE may transmit the acknowledgment feedback of the combined signal in accordance with a phase shift, the combined signal being a combination of the first signal and the second signal, and the phase shift determined based on a first acknowledgment feedback of the first signal and a second acknowledgment feedback of the second signal. The operations of 1915 may be performed according to the methods described herein. In some examples, aspects of the operations of 1915 may be performed by a phase shift application component as described with reference to FIGS. 9 through 12.

FIG. 20 shows a flowchart illustrating a method 2000 that supports acknowledgment reporting for multi-link transmissions in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a first signal on a first radio link and a second signal on a second radio link. The operations of 2005 may be performed according to the methods described herein. In some examples, aspects of the operations of 2005 may be performed by a multi-link transmitter as described with reference to FIGS. 13 through 16.

At 2010, the base station may receive, from the UE, acknowledgment feedback of a combined signal that is a combination of the first signal and the second signal, the acknowledgment feedback of the combined signal comprising a phase shift that indicates a first acknowledgment feedback for the first signal and a second acknowledgment feedback for the second signal. The operations of 2010 may be performed according to the methods described herein. In some examples, aspects of the operations of 2010 may be performed by a combined signal acknowledgment feedback component as described with reference to FIGS. 13 through 16.

FIG. 21 shows a flowchart illustrating a method 2100 that supports acknowledgment reporting for multi-link transmissions in accordance with aspects of the present disclosure. The operations of method 2100 may be implemented by a base station 105 or its components as described herein. For example, the operations of method 2100 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a first signal on a first radio link and a second signal on a second radio link. The operations of 2105 may be performed according to the methods described herein. In some examples, aspects of the operations of 2105 may be performed by a multi-link transmitter as described with reference to FIGS. 13 through 16.

At 2110, the base station may receive, from the UE, acknowledgment feedback of a combined signal that is a combination of the first signal and the second signal, the acknowledgment feedback of the combined signal including a phase shift that indicates a first acknowledgment feedback for the first signal and a second acknowledgment feedback for the second signal. The operations of 2110 may be performed according to the methods described herein. In some examples, aspects of the operations of 2110 may be performed by a combined signal acknowledgment feedback component as described with reference to FIGS. 13 through 16.

At 2115, the base station may determine to retransmit the first signal on the first radio link or the second signal on the second radio link based on the phase shift. The operations of 2115 may be performed according to the methods described herein. In some examples, aspects of the operations of 2115 may be performed by a retransmission determination component as described with reference to FIGS. 13 through 16.

Figure 22:
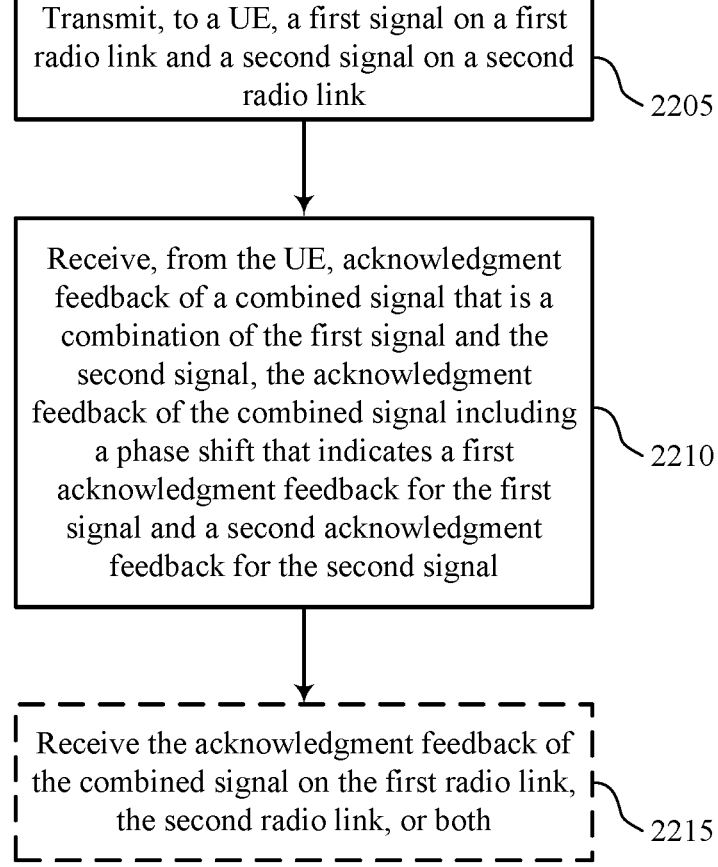

FIG. 22 shows a flowchart illustrating a method 2200 that supports acknowledgment reporting for multi-link transmissions in accordance with aspects of the present disclosure. The operations of method 2200 may be implemented by a base station 105 or its components as described herein. For example, the operations of method 2200 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, a first signal on a first radio link and a second signal on a second radio link. The operations of 2205 may be performed according to the methods described herein. In some examples, aspects of the operations of 2205 may be performed by a multi-link transmitter as described with reference to FIGS. 13 through 16.

At 2210, the base station may receive, from the UE, acknowledgment feedback of a combined signal that is a combination of the first signal and the second signal, the acknowledgment feedback of the combined signal including a phase shift that indicates a first acknowledgment feedback for the first signal and a second acknowledgment feedback for the second signal. The operations of 2210 may be performed according to the methods described herein. In some examples, aspects of the operations of 2210 may be performed by a combined signal acknowledgment feedback component as described with reference to FIGS. 13 through 16.

At 2215, the base station may receive the acknowledgment feedback of the combined signal on the first radio link, the second radio link, or both. The operations of 2215 may be performed according to the methods described herein. In some examples, aspects of the operations of 2215 may be performed by a radio link reception component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The following provides an overview of examples aspects of the present disclosure:

Aspect 1: A method for wireless communications at a user equipment (UE), comprising: receiving a first signal on a first radio link and a second signal on a second radio link; and transmitting acknowledgment feedback of a combined signal in accordance with a phase shift, the combined signal being a combination of the first signal and the second signal, and the phase shift determined based at least in part on a first acknowledgment feedback of the first signal and a second acknowledgment feedback of the second signal.

Aspect 2: The method of aspect 1, further comprising: determining to transmit the acknowledgment feedback of the combined signal on the first radio link or the second radio link based at least in part on a first signal quality of the first radio link, a second signal quality of the second radio link, or both.

Aspect 3: The method of aspect 2, wherein the acknowledgment feedback of the combined signal is transmitted on the first radio link based at least in part on the first signal quality being higher than the second signal quality, or the acknowledgment feedback of the combined signal is transmitted on the second radio link based at least in part on the second signal quality being higher than the first signal quality.

Aspect 4: The method of any of aspects 1 to 3, further comprising: determining the first signal is unsuccessfully received, the second signal is unsuccessfully received, and the combined signal is unsuccessfully received, wherein the phase shift is determined to be zero based at least in part on unsuccessfully receiving the first signal, the second signal, and the combined signal.

Aspect 5: The method of any of aspects 1 to 3, further comprising: determining the first signal is unsuccessfully received, the second signal is unsuccessfully received, and the combined signal is unsuccessfully received, wherein the phase shift is determined based at least in part on unsuccessfully receiving the first signal, the second signal, and the combined signal and wherein the determined phase shift is different than a phase shift option for a successful reception and decoding of the combined signal.

Aspect 6: The method of any of aspects 1 to 5, further comprising: determining the first signal is successfully received and the second signal is successfully received; and refraining from transmitting the acknowledgment feedback of the combined signal based at least in part on successfully receiving the first signal and the second signal.

Aspect 7: The method of any of aspects 1 to 6, wherein the phase shift is based at least in part on whether the first signal is successfully received and whether the second signal is successfully received.

Aspect 8: The method of any of aspects 1 to 7, wherein the phase shift is applied to the acknowledgment feedback of the combined signal based at least in part on the first signal or the second signal being successfully received.

Aspect 9: The method of any of aspects 1 to 8, further comprising: receiving an additional signal on an additional radio link; and determining additional acknowledgment feedback for the additional signal, wherein the phase shift is determined based at least in part on the additional acknowledgment feedback for the additional signal and the acknowledgment feedback of the combined signal is transmitted based at least in part on the additional signal.

Aspect 10: The method of any of aspects 1 to 9, further comprising: determining to transmit the acknowledgment feedback of the combined signal on the first radio link based at least in part on the first signal being successfully received or to transmit the acknowledgment feedback of the combined signal on the second radio link based at least in part on the second signal being successfully received.

Aspect 11: The method of any of aspects 1 to 10, further comprising: determining to transmit the acknowledgment feedback of the combined signal on the first radio link based at least in part on the first signal being unsuccessfully received or to transmit the acknowledgment feedback of the combined signal on the second radio link based at least in part on the second signal being unsuccessfully received.

Aspect 12: The method of any of aspects 1 to 11, further comprising: determining to transmit the acknowledgment feedback of the combined signal on the first radio link and on the second radio link.

Aspect 13: The method of any of aspects 1 to 12, further comprising: determining to transmit the acknowledgment feedback of the combined signal based at least in part on the first signal being unsuccessfully received, the second signal being unsuccessfully received, or both signals being unsuccessfully received.

Aspect 14: The method of any of aspects 1 to 13, wherein the first radio link and the second radio link comprise separate beams, radio links via component carriers, radio links with separate transmission/reception points, or a combination thereof.

Aspect 15: An apparatus at a user equipment (UE) comprising at least one means for performing a method of any of aspects 1 to 14.

Aspect 16: An apparatus for wireless communications at a user equipment (UE), comprising: a processor; and memory coupled to the processor, the processor and memory configured to perform a method of any of aspects 1 to 14.

Aspect 17: A non-transitory computer-readable medium storing code for wireless communications at a user equipment (UE), the code comprising instructions executable by a processor to perform a method of any of aspects 1 to 14.

Aspect 18: A method for wireless communications at a base station, comprising: transmitting, to a user equipment (UE), a first signal on a first radio link and a second signal on a second radio link; and receiving, from the UE, acknowledgment feedback of a combined signal that is a combination of the first signal and the second signal, the acknowledgment feedback of the combined signal comprising a phase shift that indicates a first acknowledgment feedback for the first signal and a second acknowledgment feedback for the second signal.

Aspect 19: The method of aspect 18, further comprising: determining to retransmit the first signal on the first radio link or the second signal on the second radio link based at least in part on the phase shift.

Aspect 20: The method of any of aspects 18 or 19, the receiving the acknowledgment feedback of the combined signal further comprising: receiving the acknowledgment feedback of the combined signal on the first radio link, the second radio link, or both.

Aspect 21: The method of aspect 20, wherein the acknowledgment feedback of the combined signal is received on the first radio link based at least in part on the first signal being successfully received at the UE or on the second radio link based at least in part on the first signal being successfully received at the UE.

Aspect 22: The method of aspect 20, wherein the acknowledgment feedback of the combined signal is received on the first radio link based at least in part on the first signal being unsuccessfully received at the UE, on the second radio link based at least in part on the second signal being unsuccessfully received at the UE, or on the first radio link and the second radio link based at least in part on the first signal and the second signal being unsuccessfully received at the UE.

Aspect 23: The method of any of aspects 18 to 22, further comprising: determining the first signal is unsuccessfully received at the UE, the second signal is unsuccessfully received at the UE, and the combined signal is unsuccessfully received at the UE based at least in part on the phase shift being zero or a value indicative of the first signal, the second signal, and the combined signal being unsuccessfully received at the UE.

Aspect 24: The method of any of aspects 18 to 23, further comprising: transmitting, to the UE, an additional signal on an additional radio link, wherein the acknowledgment feedback of the combined signal is received based at least in part on the additional signal and wherein the phase shift indicates an additional acknowledgment feedback for the additional signal.

Aspect 25: The method of any of aspects 18 to 24, wherein the first radio link and the second radio link comprise separate beams, radio links via component carriers, or a combination thereof.

Aspect 26: The method of any of aspects 18 to 25, wherein the phase shift indicates the first signal, the second signal, or both are unsuccessfully received at the UE via the first acknowledgment feedback and the second acknowledgment feedback.

Aspect 27: An apparatus at a base station comprising at least one means for performing a method of any of aspects 18 to 26.

Aspect 28: An apparatus for wireless communications at a base station comprising: a processor; and memory coupled to the processor, the processor and memory configured to perform a method of any of aspects 18 to 26.

Aspect 29: A non-transitory computer-readable medium storing code for wireless communications at a base station, the code comprising instructions executable by a processor to perform a method of any of aspects 18 to 26

What is claimed is:

1. A method for wireless communications at a user equipment (UE), comprising:
receiving a first signal on a first radio link and a second signal on a second radio link, wherein the first signal and the second signal are associated with a combined downlink signal that is a combination of the first signal and the second signal; and
transmitting acknowledgment feedback indicating each of a decoding result of the combined downlink signal, a first individual decoding result of the first signal, and a second individual decoding result of the second signal, wherein the acknowledgment feedback is transmitted in accordance with a phase shift that is determined based at least in part on the first individual decoding result of the first signal and the second individual decoding result of the second signal.

2. The method of claim 1, further comprising:
determining the first signal is unsuccessfully received, the second signal is unsuccessfully received, and the combined downlink signal is unsuccessfully received, wherein the phase shift is determined to be zero based at least in part on unsuccessfully receiving the first signal, the second signal, and the combined downlink signal.

3. The method of claim 1, further comprising:
determining the first signal is unsuccessfully received, the second signal is unsuccessfully received, and the combined downlink signal is unsuccessfully received, wherein the phase shift is determined based at least in part on unsuccessfully receiving the first signal, the second signal, and the combined downlink signal, and wherein the phase shift is different than a phase shift option for a successful reception and decoding of the combined downlink signal.

4. The method of claim 1, further comprising:
determining to transmit the acknowledgment feedback of the combined downlink signal on the first radio link or the second radio link based at least in part on a first signal quality of the first radio link, a second signal quality of the second radio link, or both.

5. The method of claim 4, wherein the acknowledgment feedback of the combined downlink signal is transmitted on the first radio link based at least in part on the first signal quality being higher than the second signal quality, or wherein the acknowledgment feedback of the combined downlink signal is transmitted on the second radio link based at least in part on the second signal quality being higher than the first signal quality.

6. The method of claim 1, further comprising:
receiving an additional signal on an additional radio link; and
determining an additional individual decoding result of the additional signal, wherein the phase shift is determined based at least in part on the additional individual decoding result of the additional signal, and wherein the acknowledgment feedback of the combined downlink signal is transmitted based at least in part on the additional signal.

7. The method of claim 1, further comprising:
determining to transmit the acknowledgment feedback of the combined downlink signal on the first radio link based at least in part on the first signal being successfully received or to transmit the acknowledgment feedback of the combined downlink signal on the second radio link based at least in part on the second signal being successfully received.

8. The method of claim 1, further comprising:
determining to transmit the acknowledgment feedback of the combined downlink signal on the first radio link based at least in part on the first signal being unsuccessfully received or to transmit the acknowledgment feedback of the combined downlink signal on the second radio link based at least in part on the second signal being unsuccessfully received.

9. The method of claim 1, further comprising:
determining to transmit the acknowledgment feedback of the combined downlink signal on the first radio link and on the second radio link.

10. The method of claim 1, further comprising:

determining to transmit the acknowledgment feedback of the combined downlink signal based at least in part on the first signal being unsuccessfully received, the second signal being unsuccessfully received, or both signals being unsuccessfully received.

11. The method of claim 1, wherein the first radio link and the second radio link comprise separate beams, radio links via component carriers, radio links with separate transmission/reception points, or a combination thereof.

12. A method for wireless communications at a base station, comprising:

transmitting, to a user equipment (UE), a first signal on a first radio link and a second signal on a second radio link, wherein the first signal and the second signal are associated with a combined downlink signal that is a combination of the first signal and the second signal; and receiving, from the UE, acknowledgment feedback indicating each of a decoding result of the combined downlink signal, a first individual decoding result of the first signal, and a second individual decoding result of the second signal, the acknowledgment feedback comprising a phase shift that indicates the first individual decoding result of the first signal and the second individual decoding result of the second signal.

13. The method of claim 12, further comprising:

determining to retransmit the first signal on the first radio link or the second signal on the second radio link based at least in part on the phase shift.

14. The method of claim 12, further comprising:

determining the first signal is unsuccessfully received at the UE, the second signal is unsuccessfully received at the UE, and the combined downlink signal is unsuccessfully received at the UE based at least in part on the phase shift being zero or a value indicative of the first signal, the second signal, and the combined downlink signal being unsuccessfully received at the UE.

15. The method of claim 12, wherein receiving the acknowledgment feedback of the combined downlink signal further comprises:

receiving the acknowledgment feedback of the combined downlink signal on the first radio link, the second radio link, or both.

16. The method of claim 15, wherein the acknowledgment feedback of the combined downlink signal is received on the first radio link based at least in part on the first signal being successfully received at the UE or on the second radio link based at least in part on the first signal being successfully received at the UE.

17. The method of claim 15, wherein the acknowledgment feedback of the combined downlink signal is received on the first radio link based at least in part on the first signal being unsuccessfully received at the UE, on the second radio link based at least in part on the second signal being unsuccessfully received at the UE, or on the first radio link and the second radio link based at least in part on the first signal and the second signal being unsuccessfully received at the UE.

18. The method of claim 12, further comprising:

transmitting, to the UE, an additional signal on an additional radio link, wherein the acknowledgment feedback of the combined downlink signal is received based at least in part on the additional signal, and wherein the phase shift indicates an additional individual decoding result of the additional signal.

19. The method of claim 12, wherein the first radio link and the second radio link comprise separate beams, radio links via component carriers, or a combination thereof.

20. The method of claim 12, wherein the phase shift indicates the first signal, the second signal, or both are unsuccessfully received at the UE via the first individual decoding result and the second individual decoding result.

21. An apparatus for wireless communication at a user equipment (UE), comprising:

one or more processors; and one or more memories coupled with the one or more processors, the one or more processors and one or more memories configured to:

receive a first signal on a first radio link and a second signal on a second radio link, wherein the first signal and the second signal are associated with a combined downlink signal that is a combination of the first signal and the second signal; and transmit acknowledgment feedback indicating each of a decoding result of the combined downlink signal, a first individual decoding result of the first signal, and a second individual decoding result of the second signal, wherein the acknowledgment feedback is transmitted in accordance with a phase shift that is determined based at least in part on the first individual decoding result of the first signal and the second individual decoding result of the second signal.

22. The apparatus of claim 21, wherein the one or more processors and the one or more memories are further configured to:

determine the first signal is unsuccessfully received, the second signal is unsuccessfully received, and the combined downlink signal is unsuccessfully received, wherein the phase shift is determined to be zero based at least in part on unsuccessfully receiving the first signal, the second signal, and the combined downlink signal.

23. The apparatus of claim 21, wherein the one or more processors and the one or more memories are further configured to:

determine the first signal is unsuccessfully received, the second signal is unsuccessfully received, and the combined downlink signal is unsuccessfully received, wherein the phase shift is determined based at least in part on unsuccessfully receiving the first signal, the second signal, and the combined downlink signal, and wherein the phase shift is different than a phase shift option for a successful reception and decoding of the combined downlink signal.

24. The apparatus of claim 21, wherein the one or more processors and the one or more memories are further configured to:

determine to transmit the acknowledgment feedback of the combined downlink signal on the first radio link or the second radio link based at least in part on a first signal quality of the first radio link, a second signal quality of the second radio link, or both.

25. The apparatus of claim 21, wherein the apparatus further comprises:

one or more antennas, wherein the one or more processors and the one or more memories are further configured to:

receive, via the one or more antennas, an additional signal on an additional radio link; and determine an additional individual decoding result of the additional signal, wherein the phase shift is determined based at least in part on the additional individual decoding result of the additional signal, and wherein the acknowledgment feedback of the combined downlink signal is transmitted based at least in part on the additional signal.

26. The apparatus of claim 21, wherein the one or more processors and the one or more memories are further configured to:

determine to transmit, via one or more antennas of the UE, the acknowledgment feedback of the combined downlink signal on the first radio link based at least in part on the first signal being successfully received or to transmit the acknowledgment feedback of the combined downlink signal on the second radio link based at least in part on the second signal being successfully received.

27. The apparatus of claim 21, wherein the one or more processors and the one or more memories are further configured to:

determine to transmit, via one or more antennas of the UE, the acknowledgment feedback of the combined downlink signal on the first radio link based at least in part on the first signal being unsuccessfully received or to transmit the acknowledgment feedback of the combined downlink signal on the second radio link based at least in part on the second signal being unsuccessfully received.

28. The apparatus of claim 21, wherein the one or more processors and the one or more memories are further configured to:

determine to transmit, via one or more antennas of the UE, the acknowledgment feedback of the combined downlink signal on the first radio link and on the second radio link.

29. An apparatus for wireless communication at a base station, comprising:

one or more processors; and one or more memories coupled with the one or more processors, the one or more processors and one or more memories configured to:

transmit, to a user equipment (UE), a first signal on a first radio link and a second signal on a second radio link, wherein the first signal and the second signal are associated with a combined downlink signal that is a combination of the first signal and the second signal; and receive, from the UE, acknowledgment feedback indicating each of a decoding result of the combined downlink signal, a first individual decoding result of the first signal, and a second individual decoding result of the second signal, the acknowledgment feedback comprising a phase shift that indicates the first individual decoding result of the first signal and the second individual decoding result of the second signal.

30. The apparatus of claim 29, wherein the apparatus further comprises:

one or more antennas, wherein the one or more processors and the one or more memories are further configured to:

determine to retransmit, via the one or more antennas, the first signal on the first radio link or the second signal on the second radio link based at least in part on the phase shift.

* * * * *